United States Patent [19]
Kumta et al.

[11] Patent Number: 6,017,654
[45] Date of Patent: Jan. 25, 2000

[54] CATHODE MATERIALS FOR LITHIUM-ION SECONDARY CELLS

[75] Inventors: Prashant Nagesh Kumta; Chun-Chieh Chang, both of Pittsburgh, Pa.; Mandyam Ammanjee Sriram, Beaverton, Oreg.

[73] Assignee: Carnegie Mellon University, Pittsburgh, Pa.

[21] Appl. No.: 08/906,024

[22] Filed: Aug. 4, 1997

[51] Int. Cl.$^7$ ................................................ H01M 4/02
[52] U.S. Cl. .................................... 429/231.95; 429/223
[58] Field of Search .................................. 429/223, 221, 429/224, 231.1, 231.2, 231.3, 231.5, 231.95, 229, 231.6

[56] References Cited

U.S. PATENT DOCUMENTS

| | | | |
|---|---|---|---|
| 4,308,299 | 12/1981 | Arendt . | |
| 4,336,315 | 6/1982 | Eda et al. . | |
| 4,770,960 | 9/1988 | Nagaura et al. . | |
| 4,802,958 | 2/1989 | Mazanac et al. . | |
| 4,992,342 | 2/1991 | Singh et al. . | |
| 5,028,500 | 7/1991 | Fong et al. . | |
| 5,114,811 | 5/1992 | Ebel et al. . | |
| 5,168,019 | 12/1992 | Sugeno . | |
| 5,264,201 | 11/1993 | Dahn et al. ............................. | 423/594 |
| 5,356,731 | 10/1994 | Sitters et al. . | |
| 5,589,287 | 12/1996 | Hatoh et al. . | |
| 5,591,543 | 1/1997 | Peled et al. . | |
| 5,609,975 | 3/1997 | Hasegawa et al. ..................... | 429/217 |
| 5,648,057 | 7/1997 | Ueda et al. ............................. | 423/594 |
| 5,672,446 | 9/1997 | Barker et al. ......................... | 429/218 |
| 5,679,481 | 10/1997 | Takanishi et al. ..................... | 429/223 |
| 5,700,598 | 12/1997 | Denis ..................................... | 429/218 |
| 5,759,717 | 6/1998 | Amine et al. ........................... | 429/218 |
| 5,783,332 | 7/1998 | Amine et al. ........................... | 429/218 |

OTHER PUBLICATIONS

R. J. Gummow, et al., "Improved Capacity Retention in Rechargeable 4V Lithium/Lithium–Maganese Oxide (Spinel) Cells," *Solid State Ionics*, vol. 69, pp. 59–67 (1994).

K. Brandt, *Solid State Ionics*, 69, (1994), pp. 173–183.

A. Hirano et al., "Relationship between non–Stoichiometry and Physical Properties in LiNiO$_2$," *Solid State Ionics*, 78 (1995).

A. R. Armstrong and P. Bruce, "Synthesis of layered LiMNO$_2$ as an electrode for rechargeable lithium batteries", *Nature*, vol. 38 (Jun. 6, 1996), pp. 499–500.

*Primary Examiner*—Maria Nuzzolillo
*Assistant Examiner*—Monique M. Wills
*Attorney, Agent, or Firm*—Kirkpatrick & Lockhart LLP

[57] ABSTRACT

Crystalline lithiated transition metal oxide materials having a rhombohedral R-3m crystal structure includes divalent cations selected and added in amounts so that all or a portion of the divalent cations occupy sites in transition metal atom layers within the materials' crystal lattice. The lithiated transition metal oxides are useful as cathode materials in lithium-ion secondary cells. The materials include, but are not limited to, $Li_{1+x}Ni_{1-y}M_yN_xO_{2(1+x)}$ and $Li_1Ni_{1-y}M_yN_xO_p$, wherein M is a transition metal selected from titanium, vanadium, chromium, manganese, iron, cobalt, and aluminum, and N is a group II element selected from magnesium, calcium, strontium, barium, and zinc. The materials provide improved cyclability and high voltage capacity as cathodes in lithium-ion secondary cells. Processes for producing the divalent cation-containing lithium transition metal oxide materials of the invention are also disclosed.

36 Claims, 13 Drawing Sheets

CATHODE MATERIALS FOR LITHIUM-ION SECONDARY CELLS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD AND INDUSTRIAL APPLICABILITY OF THE INVENTION

The present invention relates to improved battery cathode materials. The present invention more particularly relates to lithiated transition metal oxide cathode materials having a rhombohedral R-3m crystal structure and which have been doped by additions of at least one group II cation. The cathode materials of the present invention exhibit high capacity, high voltage durability, and reduced fade in specific capacity over a course of discharge-recharge cycling.

BACKGROUND OF THE INVENTION

With ever-increasing demand for portable computers, cellular telephones, and portable electronic devices of all kinds, the need for improved rechargeable batteries has correspondingly also increased. Rechargeable batteries, also known as "secondary batteries", consist basically of a cathode, an anode, and a liquid electrolyte or other material interposed between the cathode and anode, and which allows the movement of ions between the anode and cathode. The properties sought in rechargeable batteries include high capacity, good cyclability, and high voltage durability.

The "capacity" of a rechargeable battery may be measured in units of mAh/g and is a measure of deliverable charge per unit weight of material. The "cyclability" of a rechargeable battery, also known as "cycling behavior" or "cycle life", is a measure of the rate at which the battery's capacity decreases, or "fades", over a course of discharge-recharge cycles. Cyclability may be represented as the average percentage reduction in capacity over the selected course of discharge-recharge cycles. High cyclability is a direct measure of the usable life of the battery and is a particularly important property when the production and resultant consumer costs of the battery are high. The "voltage durability" of a rechargeable battery is typically measured in units of volts and represents the upper limit of voltage to which a battery can be charged without causing damage to the structural integrity of the cathode material. Therefore, a battery having a relatively high voltage durability will perform as well in terms of capacity fade when charged to high voltages as it would when charged to lower voltages. Greater voltage durability is desirable because batteries charged to higher voltages can yield higher capacities and energy densities. The "energy density" of a battery is the net energy that a battery can deliver during discharge per unit weight of the active cathode material. Energy density is an integrated product of the voltage and charge per unit weight of the material and may be calculated as $E = (1/M)_o \int V(q)dq$, where M is the weight of the active material in the cathode, Q is the net charge after discharge, and V(q) is voltage as a function of charge (q). A high energy density is desirable because a battery of a given weight having a higher energy density could deliver higher energy for a given application.

The accelerating commercial significance of the market for rechargeable batteries renders an improvement in any of the foregoing properties, a substantial advantage over the existing battery formulations. Therefore, investigators have continually sought to provide improved rechargeable battery cathode compositions.

One family of rechargeable batteries, the lithium-ion rechargeable batteries, include a cathode composed of lithium-based crystalline material. The crystal lattice of the cathode material provides a structural framework for lithium ions: lithium ions may be removed from and intercalated back into the cathode's crystalline framework. Thus, the cathode material is considered the "active" material in lithium-ion rechargeable batteries. During charging, lithium ions are removed from the cathode material and are either deposited on or intercalated into the anode (depending on the type of anode used). During discharge, the lithium ions are intercalated back into the cathode material, facilitating the flow of current between the battery's terminals. During the charge and discharge cycles, the cathode containing the active material should not undergo any significant structural change in order to preserve the reversibility of the reaction. It is the stability of the crystal structure of the cathode material that allows the reactions to be reversed and the reserve of lithium ions to be repeatedly intercalated back into the cathode material during the discharge reaction. It will be understood that the performance of the battery depends in large part on the composition of the cathode material, which in turn directly influences the battery's specific capacity, energy density, current capability, and cyclability.

The family of lithium-ion batteries include those wherein the cathode is composed of lithium transition metal oxides. Lithium transition metal oxides commonly known for use as cathode material include lithium manganese oxide-spinel ($LiMn_2O_4$), lithium nickel oxide ($LiNiO_2$), and lithium cobalt oxide ($LiCoO_2$). All of these materials work by the reversible transfer of lithium ions discussed above. During the charge cycle, lithium ions are removed from the cathode and are deposited on or intercalated into the anode, leaving the intrinsic structure of the cathode substantially intact. During discharge, the lithium ions spontaneously intercalate back into the cathode. The common lithium transition metal oxides show a high voltage with respect to lithium (in the range of 3.8 to 4 V) and, because they have low molecular weights, provide a high energy density.

Table 1 provides the energy density of $LiMn_2O_4$, $LiNiO_2$, and $LiCoO_2$ cathode materials using coke as anodes according to K. Brandt, Solid State Ionics, 69 (1994), pages 173–183. Table 1 also ranks the relative cyclability, cost of manufacture, and ease of synthesis of the materials based on current information generally available to those in the battery art.

TABLE 1

| Material | Energy Density (Wh/kg) | Cyclability | Cost | Ease of Synthesis |
| --- | --- | --- | --- | --- |
| $LiCoO_2$ | 276 | good | high | easy |
| $LiNiO_2$ | 321 | poor | intermediate | difficult |
| $LiMn_2O_4$ | 305 | intermediate | low | intermediate |

Among the three materials, $LiMn_2O_4$ and $LiNiO_2$ currently are significantly less expensive to manufacture and have less of an environmental impact than $LiCoO_2$. However, the inconsistent cycling behavior of $LiMn_2O_4$ and $LiNiO_2$ presently limits their application. If the cyclability of $LiMn_2O_4$ and $LiNiO_2$ is improved, it is possible that the materials could replace $LiCoO_2$ as the preferred cathode material in lithium-ion rechargeable batteries.

One approach that has been taken to improve the cycling stability derived from lithium transition metal oxides is to include in the materials other elements in the periodic table. In some instances, the resulting variation of the crystal structure from, for example, the $LiMn_2O_4$, $LiNiO_2$, and $LiCoO_2$ stoichiometries of the undoped compounds, has resulted in improvements in the materials' electrochemical properties.

R. J. Gummow et al., "Improved Capacity Retention in Rechargeable 4 V Lithium/Lithium-Manganese Oxide (Spinel) Cells", *Solid State Ionics* (69), pages 59–67, suggests that the addition of excess lithium in $LiMn_2O_4$ improves the material's cycling behavior. The reference also suggests that the substitution of a portion of the manganese in $LiMn_2O_4$ with additions of magnesium or zinc provides improved cycling behavior. However, although improvement in the materials' cycling stability may result, the specific capacity of the magnesium-or zinc-doped $LiMn_2O_4$ spinel materials is low and in the range of 90–105 mAh/g.

U.S. Pat. No. 5,264,201, the entire disclosure of which is hereby incorporated herein by reference, discloses a material having improved cycling stability represented by the formula $Li_xNi_{2-x-y}M_yO_2$ wherein x is between about 0.8 and about 1.0, M is one or more of cobalt, iron, titanium, manganese, chromium, and vanadium, and $y \leq 0.2$, except that $y \leq 0.5$ for cobalt. In pure $LiNiO_2$, metal atom layers of substantially pure lithium and substantially pure nickel alternate between layers of substantially pure oxygen. As the stoichiometry of lithium decreases from 1.0, nickel atoms are incorporated into the lithium atom layer, which inhibits de-intercalation of lithium atoms. The inventors of the '201 patent suggest that by maintaining x within the stated range, nickel atoms are not incorporated into the lithium atom layers in amounts that substantially reduce the ability of lithium to be de-intercalated. Although the different substitutions and adjustments in stoichiometry suggested in the '201 patent may have shown some improvement over pure $LiNiO_2$ materials, the improved materials still do not provide the cycling stability of $LiCoO_2$ materials. Neither do the materials of the '201 patent posses the voltage durability believed necessary to significantly improve the performance and, hence, the applicability of the materials.

U.S. Pat. No. 5,591,543, the entire disclosure of which is hereby incorporated herein by reference, discloses a family of lithium-ion cathode materials of the composition $Li_{1-x}Q_{x/2}ZO_m$, wherein Z is a transition metal selected from cobalt, nickel, manganese, iron, and vanadium, Q is selected from the group II elements calcium, magnesium, strontium, and barium, and m is 2 or 2.5 depending on the identity of Z. The '543 patent's inventors note that the addition of oxides or carbonate compounds of the element Q during synthesis is believed to result in the incorporation of a portion of $Q^{+2}$ cations into lithium sites within the $LiCoO_2$ lattice, while the remainder of the QO or $QCO_3$ compounds becomes admixed in that form within the finished cathode. The dissolution of the group II oxides and carbonates during cycling buffers the electrolyte and acts as a desiccant by reacting with water and acid impurities in the electrolyte. The inventors of the '543 patent possibly ascribe the improved cyclability of their materials to the desiccating action of the group II oxides and carbonates.

As shown by FIGS. 4, 6, and 8 of the '543 patent, secondary cells incorporating cathodes of the materials disclosed in that patent may be charged up to 4.2 V. The need remains for lithium transition metal oxide cathode materials allowing higher charging voltages. First of all, materials that can be charged to higher voltage (in excess of 4.2 V) can exhibit higher capacities and energy densities. As explained above, such improved properties may provide a significant advantage in an application. Moreover, current cathode materials exhibiting the R3m (also referenced herein as "R-3m") crystal structure are not stable when charged to voltages in excess of about 4.2 to 4.3. V. When the lithium content in the cathode materials is reduced to a certain concentration during charging (in the range of about 4.2 to 4.3 V), a structural change may occur in the materials that makes their fade characteristics poor. Thus, the ability of a cathode material to be charged above 4.2 V is an important characteristic. If a cathode material will remain stable on repeated charging up to voltages higher than those achievable in current cathode material formulations, the improved material can provide additional capacity during discharge.

Accordingly, even considering the incremental improvements in cycling stability and other electrochemical properties that may be achieved by the inventions described above and other recent advances in secondary battery construction, a need remains for lithium-ion cathode materials providing improved cycling stability, higher voltage capacities, and corresponding improvements in other related electrochemical properties.

SUMMARY OF THE INVENTION

The present invention is directed to improved secondary battery cathode materials in the form of lithiated transition metal oxides having a rhombohedral R-3m crystal structure and that include additions of divalent cations. The divalent cationic dopants preferably are selected from magnesium, calcium, strontium, barium, and zinc. The divalent cationic dopants are selected and are added in amounts so that all or a portion of the dopant atoms occupy sites in the materials' crystal lattice that otherwise would be occupied by transition metal atoms. The doped lithium transition metal oxides of the present invention may be, for example, doped lithium nickel oxide, lithium cobalt oxide, or lithium nickel cobalt oxide, in which case all or a portion of the divalent cationic dopant atoms occupy sites in crystal lattice layers that otherwise would be occupied by nickel, cobalt, and nickel and/or cobalt cations, respectively, in the undoped material. The doped lithium transition metal oxides of the present invention may be fabricated into cathodes for lithium-ion secondary batteries and, when used for that purpose, impart high capacity, good cyclability, and high voltage durability (up to at least about 4.4 V).

Based upon investigation and an understanding of the method of operation of the invention, the inventors believe that the addition of divalent cationic dopants in the range of about 1 to about 25 atom percent, based on the overall number of atoms in the transition metal layers of the crystal lattice, will provide a secondary battery cathode material having improved electrochemical properties over undoped materials. Further improved properties result when restricting the addition of divalent dopant to ranges of about 3 to about 15 atom percent, again based on the overall number of atoms in the crystal layers predominantly occupied by transition metal atoms. The inventors conclude that if the lithiated transition metal oxide material has a predominantly R-3m structure without the presence of the group II dopant, then adding the group II dopant as provided in the invention can cause an improvement in properties. The particular identities and addition ranges of the one or more transition metal atoms within the materials are contingent upon obtaining a single phase or predominantly single phase R-3m structure in the undoped lithiated transition metal oxide material.

The doped lithiated transition metal oxides of the present invention include, but are not limited to, the two groups of materials represented by the formulae

$$Li_{1+x}Ni_{1-y}M_yN_xO_{2(1+x)} \quad \text{(formula I)}$$

and

$$Li_1Ni_{1-y}M_yN_xO_p \quad \text{(formula II)}$$

wherein:

M is one or more transition metals selected from titanium, vanadium, chromium, manganese, iron, cobalt, and aluminum;

N is a group II element selected from magnesium, calcium, strontium, barium, and zinc;

$0 \leq y \leq 1$ when M is cobalt or manganese;

$0 \leq y \leq 0.5$ when M is titanium, vanadium, chromium, or iron;

$0 \leq y \leq 0.4$ when M is aluminum;

$0 > x \leq 0.25$ when N is magnesium or calcium; and $0 > x \leq 0.1$ when N is strontium, barium, or zinc;

wherein $2(1+x/2) \leq p \leq 2(1+x)$.

The foregoing ranges for variables x and y were determined based upon the observations of the inventors and the general solubilities of the various transition metals and divalent cationic additives in the parent $LiNiO_2$ structure.

The inventors have discovered that in the doped lithium nickel transition metal oxides represented by the above two formulae that are a part of the invention, all or a portion of the group II divalent cations occupy sites in transition metal layers within the crystal. In addition to the obvious difference in compositional formulae of the $Li_{1+x}Ni_{1-y}M_yN_xO_{2(1+x)}$ and $Li_1Ni_{1-y}M_yN_xO_p$ materials of the present invention and the $Li_{1-x}Q_{x/2}ZO_m$ materials of U.S. Pat. No. 5,591,543, the presence of divalent cations within the transition metal layers of materials of the invention also immediately distinguishes the present materials from those of the '543 patent, wherein the alkaline earth dopants reside partially within the lithium layer and partially in the form of oxides and carbonates entrained within the formed cathode. Furthermore, the present inventors believe that the enhanced properties of the present materials relative to those of the '543 patent derive from the fact that divalent cations sit on transition metal sites.

The doping of the transition metal sites by divalent cations in the present invention is believed to create defect centers in the crystal and that in certain of the materials of the invention the creation of such defect centers may increase the oxidation state of the transition metal ions. It is believed that the high voltage durability and good cyclability of the present materials may be attributed, at least in part, to the fact that increasing the oxidation state of the transition metal cations decreases the Jahn-Teller distortion effect known to affect layered crystal structures during cycling, and especially transition metals which have a high spin electronic structure (such as $Ni^{3+}$ with a $d^7$ electronic state). It is believed that reduction of the Jahn-Teller distortion and the resulting enhancement in electrochemical properties would occur by doping any material having a transition metal component and R-3m symmetry such that divalent cations occupy transition metal sites. Therefore, in its most general sense, the present invention is directed to materials having R-3m symmetry, that include transition metal atom layers, and wherein a portion of the sites within the transition metal crystal layers are occupied by divalent cations.

The present invention is also directed to cells comprising a cathode fabricated from the materials of the invention, a suitable anode, and an electrolyte that is compatible with the cathode and anode.

The present materials exhibit high capacity, low capacity fade properties, and high voltage durability. The present materials significantly improve over known lithium-ion cathode materials, wherein higher capacities are commonly associated with higher capacity fade. As discussed below, the materials of the present invention also exhibit a significant improvement in both capacity and cyclability in comparison to the materials disclosed in the '543 patent.

The present invention also is directed to processes for producing the crystalline doped lithium transition metal oxide materials of the invention. The processes generally include combining at least an amount of a lithium-containing material, an amount of a transition metal-containing material, and an amount of a material containing atoms of at least one group II element to yield a homogenous solid. Subsequently, the homogenous solid is heat treated to produce an active crystalline lithium transition metal oxide material that contains atoms of the one or more group II elements. The amounts of lithium-containing material, transition metal-containing material, and group II element-containing material are selected and processed so that in the active material the group II atoms occupy sites within crystal layers of the active material that are predominantly occupied by transition metal atoms. The method used to produce the homogenous solid may be selected from the conventional methods known to those of ordinary skill in the art. Such methods include, for example, agitation, gelation, spray drying, and solid state synthesis. The present invention also is directed to processes wherein materials of the invention are fabricated into cathodes for electrochemical cells.

BRIEF DESCRIPTION OF THE DRAWINGS

The features and advantages of the present invention may be better understood by reference to the accompanying drawings in which.

DETAILED DESCRIPTION OF THE INVENTION

Figure 1:
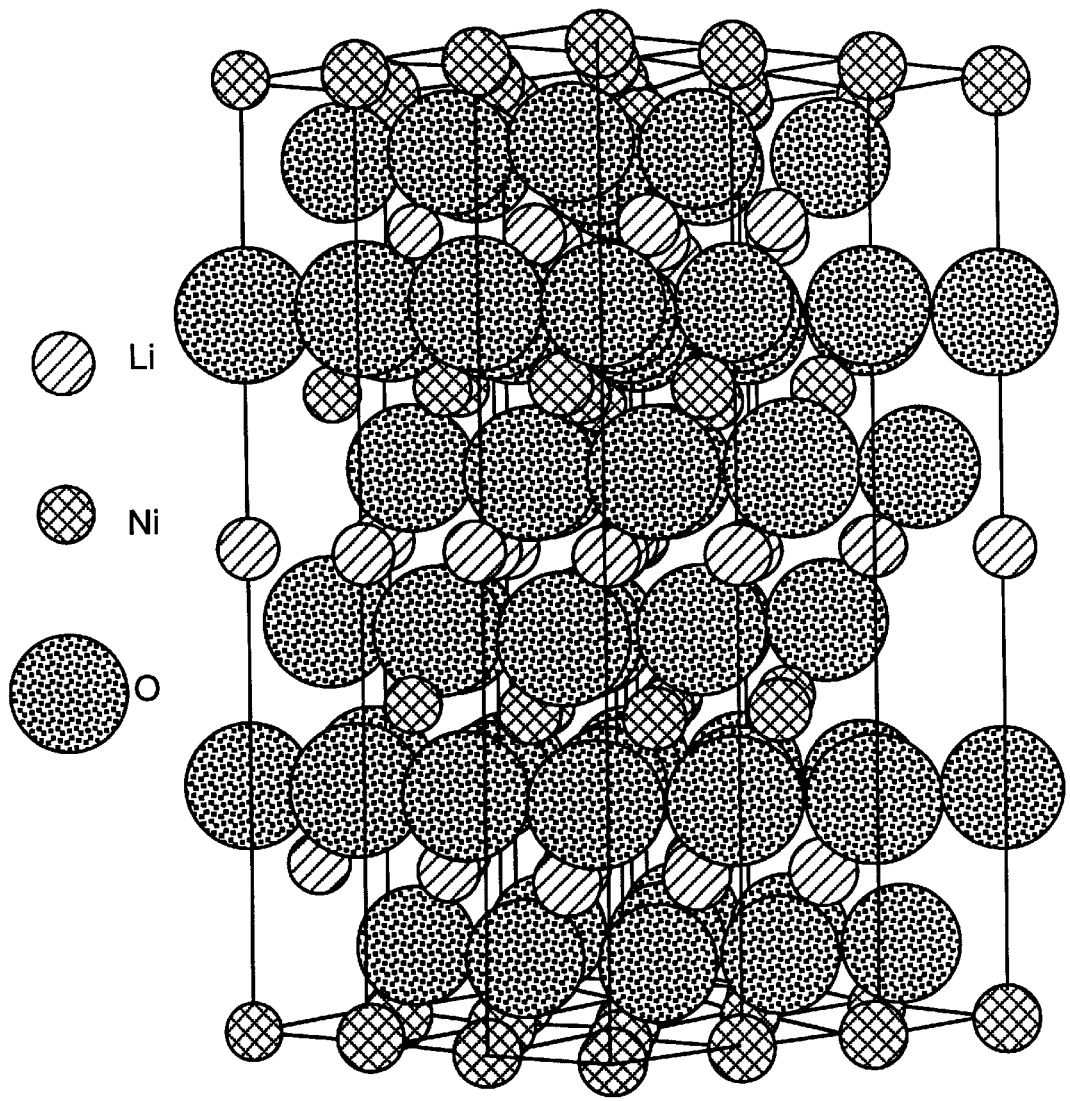
FIG. 1 is a representation of the layered rhombohedral structure of lithium nickel oxide ($LiNiO_2$)

The materials of the present invention include lithiated transition metal oxides having rhombohedral R-3m symmetry in the undoped state and that include divalent cationic dopants occupying sites within the crystal lattice that otherwise would be occupied predominately by transition metal atoms. As an example, FIG. 1 depicts the layered R-3m structure of LiNiO$_2$, in which alternating layers of lithium and layers of nickel atoms are sandwiched between layers of oxygen atoms. In its most general sense, the present invention is directed to a material wherein a portion of at least the transition metal sites (for example, nickel sites in the LiNiO$_2$ structure of FIG. 1) are occupied by divalent cations. To obtain the improved performance of the doped materials of the present invention, the addition of a number of divalent cations equivalent to about 1 to about 25 atom percent, and preferably about 3 to about 15 atom percent, based on the total number of atoms within the transition metal atom layers of the material, should be used.

As described in greater detail below, the present invention is directed, in part, to the families of compounds represented by the formulae:

$$Li_{1+x}Ni_{1-y}M_yN_xO_{2(1+x)}$$

and $$Li_1Ni_{1-y}M_yN_xO_p$$

wherein x, y, and p are as set forth in the Summary of the Invention above. Based on the results of inventor's investigations of electrochemical properties, particularly cyclability and voltage durability, of the materials of the invention, materials of the formula Li$_{1+x}$Ni$_{1-y}$M$_y$N$_x$O$_{2(1+x)}$ are preferred as the cathodes in lithium-ion secondary cells according to the invention. Of the compounds within that family, the following are believed to provide particularly desirable properties:

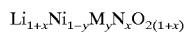
1.

where N=Mg, and 0.03≦x≦0.25, and more preferably 0.07≦x≦0.15

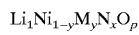
2.

where N=Mg or Ca, 0.1≦y≦0.4, and 0.03≦x≦0.25, and more preferably 0.03≦x≦0.15

$$Li_{1+x}CoN_xO_{2(1+x)}$$
3.

where N=Mg or Ca, and 0.03≦x≦0.25, and when N=Mg, more
preferably 0.03≦x≦0.15

The materials of the present invention can be fabricated into cathodes for lithium-ion secondary batteries using any known process for fabricating cathode structures from particulate cathode-active materials. Cells according to the invention comprise one or more such cathodes, a suitable anode, and an electrolyte that is compatible with cathode and anode. Any suitable anode material may be used in batteries incorporating the materials of the present invention as the cathode. The composition and construction of such anodes will be readily apparent to those of skill in the art and include, but are not limited to: lithium metal; carbon, coke, graphite, or any other suitable carbonaceous material; aluminum or lithium insertion compounds; amorphous silicon oxides; and transition metal oxides, sulfides, nitrides, oxynitrides, and oxysulfides. Preferred anode materials are coke and graphite. Cells including the present invention's cathode material may also incorporate any suitable and compatible liquid or solid electrolyte known in the art including, but not limited to, solid polymer electrolytes; solid ceramic, glass, or glass-ceramic electrolytes exhibiting a high lithium ion conductivity and a low electronic conductivity such as, for example, lithium borosilicate glass, lithium aluminum nitride, and lithium borophosphosilicate; and mixtures of one or more lithium salts (such as, for example, lithium arsenic hexafluoride, lithium phosphorous hexafluoride, and lithium chlorate) dissolved in a mixture of one or more organic solvents (such as, for example, ethyl carbonate, dimethyl carbonate, and diethyl carbonate, or mixtures thereof). Electrolytes that may be used when the cell incorporates coke or graphite anodes include (i) a mixture of 11.49 weight percent lithium phosphorus hexafluoride ($LiPF_6$), 29.39 weight percent dimethyl carbonate, and 59.11 weight percent ethylene carbonate; and (ii) a 1 molar solution of lithium phosphorus hexafluoride in a solvent blend containing 45 weight percent ethylene carbonate and 55 weight percent dimethyl carbonate.

Secondary cells comprising the material of the invention as cathode may be assembled in a variety of constructions known to those of skill in the art, including, but not limited to, flat, bobbin, or spiral wound constructions. In the cell construction incorporating coke or graphite anodes, polypropylene or polyethylene is the preferred separator. In cells according to the invention, the amount of lithium present in the cathode-active material is that quantity sufficient to saturate the counterelectrode upon charging of the cell. The cathode and anode must be capable of reversibly intercalating lithium ions via the electrolyte, with which the electrodes are in mutual contact. A preferred construction of a secondary cell according to the invention will comprise a cathode of the invention having the structure $Li_{1.1}Ni_{0.75}Co_{0.25}Mg_{0.1}O_{2.2}$, a coke anode, an $LiPF_6$-based electrolyte, and a polypropylene separator.

The materials of the present invention can be produced by providing specific starting chemicals in the desired correct stoichiometry and combining them in a manner suitable to yield a homogeneous solid. A "homogeneous solid" is used herein to refer to a solid in which there exists a minimum extent of segregation of the chemicals containing the desired elements. The homogeneous solid is then heat treated under conditions necessary to yield an active material. The term "active" material is a material capable of reversibly intercalating and de-intercalating lithium ions into and out of its structure during discharging and recharging, respectively. An "inactive" material lacks such a property.

More particularly, the materials of the present invention may be synthesized by any solid state or wet solution chemistry-based process that will yield a single or a multiple-phase material with an active phase having a composition in the range of the invention. Synthetic methods suitable for producing the materials of the present invention will be apparent to those of skill in the battery art and include, for example solid state synthesis and solution chemical synthetic methods such as sol-gel synthesis, low-temperature chemical synthesis, and solution-chemical processing. One of skill may readily apply those and the other suitable known synthetic methods, without undue experimentation, and also select appropriate precursor materials to produce cathode material having the desired active phase composition. Depending upon the synthetic method chosen, appropriate precursor materials may be chosen and mixed either in the solid state or in liquid solution at room temperature. The materials resulting from the synthetic methods may be heat treated at a temperature within a range that is appropriate for obtaining a single phase or a multiple phase material wherein the active material has a crystalline composition within the present invention.

Following are four examples of methods suitable for producing the materials of the present invention. The following examples are not exhaustive, and numerous alternative methods of manufacture will be readily apparent to those of skill in the art. Thus, the examples are provided for purposes of illustration only, and should not be interpreted to restrict the scope of the invention.

Agitation Method

A combination of soluble chemicals containing the desired molar quantities of elements and in the desired stoichiometry is dissolved in an appropriate solvent or combination of solvents to form a homogeneous solution. Examples of the soluble compounds that may be used for each of the lithium, nickel, transition metal, and group II elements are provided below in Table 2.

TABLE 2

| Lithium (Li) | Nickel (Ni) | Transition Metals (TM) | Group II Elements (G2) |
| --- | --- | --- | --- |
| Li hydroxide | Ni acetate | TM carbonate | G2 nitrate |
| Li acetate | Ni carbonate* | TM nitrate | G2 hydroxide* |
| Li carbonate | Ni hydroxide* | TM oxide* | G2 acetate |
| Li formate | Ni formate | TM hydroxide* | G2 carbonate* |
| Li nitrate | Ni acetylacetonate | TM acetate | G2 formate |
| Li oxide | Ni nitrate | TM formate | G2 oxide* |
|  | Ni oxide* |  |  |

*These chemicals may be dissolved by appropriate pH adjustment of the solution.

The identities of suitable solvents will depend upon the identities of the soluble compounds. As examples, possible solvents may include water, ethanol, methanol, ethylene glycol, or combinations thereof such as, for example, 80% water/20% ethanol and 95% methanol/5% water, each by volume. The solution is then dried at a temperature close to or higher than the boiling point of the solvent or solvents and while constantly stirring the solution. The drying technique may be selected from a variety of known drying techniques such as air drying or vacuum drying with stirring.

Upon evaporation of the one or more solvents, a homogenous solid remains in which the starting chemicals are intimately mixed. The intimate mixing of the starting chemicals is necessary to form a pure single phase material. The solid obtained after evaporation is then heat treated under conditions appropriate to provide the active material of the present invention. Possible heat treatment includes heating in air at temperatures in the range of about 600 to about 850° C. for as long as about 2–10 hours. The heated air may be stationary or forced to circulate, or fresh air may be blown into the heating furnace. A more specific example of one such heating technique is to heat the material at 800° C. for 2 hours at the temperature in stationary air using a heating and cooling rate of 2° C./minute. Other heat treating techniques will be readily apparent to ones having ordinary skill in the battery art.

Gelation Method

Lithium hydroxide and appropriate precursor compounds containing the one or more transition metals to be incorporated into the finished material are dissolved in a suitable organic solvent. Preferably, the solvent is methyl alcohol. A chemical containing the desired group II element is dissolved in water while adjusting the pH, if necessary, to maintain the chemicals in solution. The lithium hydroxide and other precursors are included in the solutions in amounts what will provide the desired molar quantities and stoichiometry to form the active compound. The identities of the possible precursor compounds are identical to those of the agitation method. The two solutions are then mixed together and allowed to stand until gelation occurs. The gel is then dried, either in a drying oven with or without vacuum or in a rotary evaporator, to obtain a solid. The solid is further heat treated as described in relation to the agitation method to yield the active phase material of the present invention.

Solid State Method

Suitable precursor chemicals containing lithium, transition metals, and group II elements in the desired molar amounts and stoichiometry are mixed together mechanically. Examples of precursor chemicals suitable for use in the solid state synthetic method include, but are not limited to, any or a combination of nitrates, hydroxides, carbonates, acetates, and formates. The mechanical mixture can be prepared using a mortar and pestle, attrition milling, ball milling, or using any other mixing and grinding machinery or process that will provide a homogeneous mixture. Such machinery and processes will be readily apparent to those in the art. The resultant homogenous mixture is then heat treated under conditions that will result in a single active phase or a mixed phase, and which has the desired composition. Heat treatment generally consists of heating the mixture at about 600–800° C. for about 5 to 20 hours in stationary, circulating, or flowing air. One example of such heat treatment is to heat the mixture at 750° C. for 10 hours in stationary air using 2° C./minute heating and cooling rates. Other suitable heat treatments will be known to those of ordinary skill. During heat treatment, depending on the amount of powder being heat treated, it may be desirable to flush or otherwise replace the atmosphere of the furnace in order to minimize the concentration of hazardous gaseous products produced by decomposition of the furnace charge.

Spray Drying Method

A combination of appropriate starting materials are dissolved in a solvent suitable to provide a clear solution containing the lithium and the desired transition metal and group II elements in the desired amounts and stoichiometry. The possible precursor materials and solvents are identical to those that may be used in the agitation method. The pH of the solution may be adjusted to obtain a clear solution by adding appropriate amounts of organic or inorganic bases or acids such as, for example, nitric acid or hydrochloric acid. The solvent may comprise, for example, one or more commonly known non-toxic solvents. The clear solution is then sprayed using an atomizing nozzle and air as the atomizing gas into a chamber in which the temperature is maintained, either by external heating or by the flow of heated air into the chamber, above the drying temperature of the solvent in order to evaporate the solution and obtain the dried powder. The dried powder is separated from the evolved gases using a cyclone separator. The collected solid is then subjected to an appropriate heat treatment operation at a temperature above its decomposition temperature to provide an active material. The heat treatment procedure used may be similar to those described in the agitation method.

Electrochemical Characterization

Samples of active material of the present invention were prepared by several of the above procedures and were tested as cathode material for their electrochemical properties using the following procedure. The active materials in powder form were mixed with acetylene black (Super S, manufactured by MMM Carbon, Willebroek, Belgium). A copolymer binder (ethylene-propylene copolymer with 60% ethylene fraction manufactured by Scientific Polymer Products, Ontario, N.Y.) was dissolved in trichloroethylene (Aldrich, spectrochemical grade). The mixture of active material and acetylene black was then added to the binder solution and stirred until a slurry formed. The slurry was then coated onto an aluminum foil and dried for 12 hours in air. The weights of the active material, acetylene black, and binder were calculated to obtain the following weight fractions in each of the final dried cathodes: 87.06 weight percent active material, 7.6 weight percent acetylene black, and 5.34 weight percent copolymer binder. Cathode discs having an area of 1 cm$^2$ were punched from the coated foils and dried at 130° C. for 12 hour under a vacuum of less than 0.1 inch of mercury. The dried cathodes were then tested in a three-electrode cell using a lithium metal foil anode, a lithium metal reference electrode, a separator (Whatman GF/D, Whatman Inc., Haverhill, Mass.), and an electrolyte consisting of 1M LiPF$_6$ in a mixture of 2:1 by weight of ethylene carbonate and dimethyl carbonate (electrochemical grade, FMC Corp., Lithium Division). The assembled cells were tested under a constant current density of 0.25 mA/cm$^2$ between voltage ranges of 3.1 and 4.4 V for 30 cycles. The capacity of the cells at the end of each discharge cycle was calculated.

Following are examples of materials of the present invention that were fabricated into cathodes, assembled into cells by the foregoing procedure, and tested for their electrochemical properties. It will be understood that the examples are merely representative of the broader scope of the invention.

EXAMPLE 1

LiNi$_{0.75}$Co$_{.25}$Mg$_{0.03}$ O$_p$ (2.03≦p≦2.06) Produced By Gelation 0.1 moles of lithium hydroxide was dissolved in 30 ml of water to form a clear transparent solution. Separately, 0.075 moles of nickel acetate (Aldrich, 98%) and 0.025 moles of cobalt acetate (Aldrich 99%) were dissolved in 150 ml of water to form a transparent dark purple solution. Separately, 0.003 moles of magnesium hydroxide was dissolved in water with 1 ml of 70% nitric acid. The lithium hydroxide solution and the solution of magnesium hydroxide were then added to the solution of cobalt and nickel acetates. This caused the formation of a turbid dark purple suspension. To this suspension, 90 ml of ethyl alcohol (200 proof) was added. It is believed that the addition of alcohol facilitates the removal of acetate groups from the solution of acetates by the formation of ethyl acetate. Ethyl acetate has a low boiling point and can be easily removed in the subsequent drying step.

The turbid dark purple solution was dried under a vacuum of 500 mbar, at 120° C. for 3 hours. The pressure was then decreased to 100 mbar at 140° C. for 1 hour to ensure complete drying. The drying procedure yielded approximately 20 grams of a hard, purple, glassy solid. The solid was ground and a batch of 6 grams of the powder was heat treated at 800° C. for 2 hours in air to yield approximately 2.8 grams of lithium nickel cobalt magnesium oxide.

Figure 2:
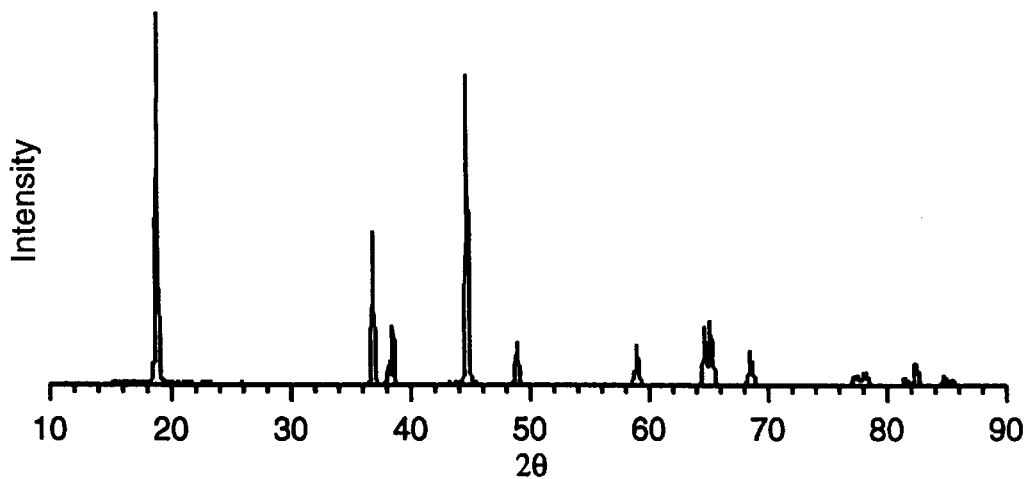
FIG. 2 is an X-ray diffraction pattern of the powdered compound $LiNi_{0.75}Co_{0.25}Mg_{0.03}O_p$ ($2.03 \leq p \leq 2.06$) produced by gelation.
Figure 3:
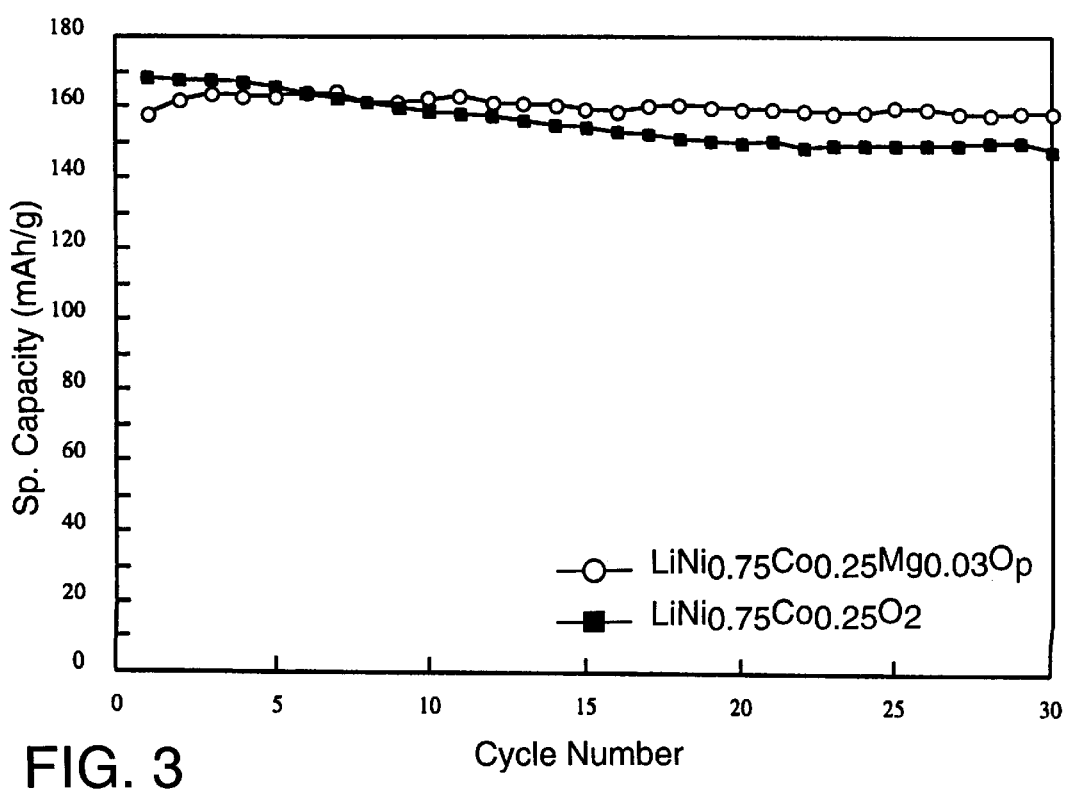
FIG. 3 is a plot of the specific capacity versus cycle number for an electrochemical cell including either $LiNi_{0.75}Co_{0.25}Mg_{0.03}O_p$ (—○—) or $LiNi_{0.75}Co_{0.25}O_2$ (—■—) as the cathode material synthesized by gelation.

The powder was characterized by X-ray diffraction and secondary cells were fabricated for the evaluation of electrochemical properties as described above. The X-ray diffraction pattern, shown in FIG. 2, indicates a single phase material in the rhombohedral R-3m setting with lattice parameters a=2.840 Å, c=14.100 Å. A plot of the specific capacity of the material as a function of cycle number is provided in FIG. 3. FIG. 3 also includes a plot of the specific capacity of lithium nickel cobalt oxide (LiNi$_{0.75}$Co$_{0.25}$O$_2$) without magnesium addition. The LiNi$_{0.75}$Co$_{0.25}$O$_2$ material was prepared using the same method as that used to prepare the LiNi$_{0.75}$Co$_{0.25}$Mg$_{0.03}$O$_p$ in this example, but without incorporating magnesium hydroxide.

FIG. 3 demonstrates that the magnesium-containing lithium nickel cobalt oxide material of the invention has superior fade characteristics. The magnesium-containing material exhibits a fade of only 0.1% per cycle over 30 cycles compared with a fade of 0.46% per cycle shown by the material lacking magnesium addition. The material of the present invention was repeatedly synthesized using the above process, as well as by the other processes described in the following examples, and desirable fade properties similar to the present example were exhibited in every case.

EXAMPLE 2

Figure 4:
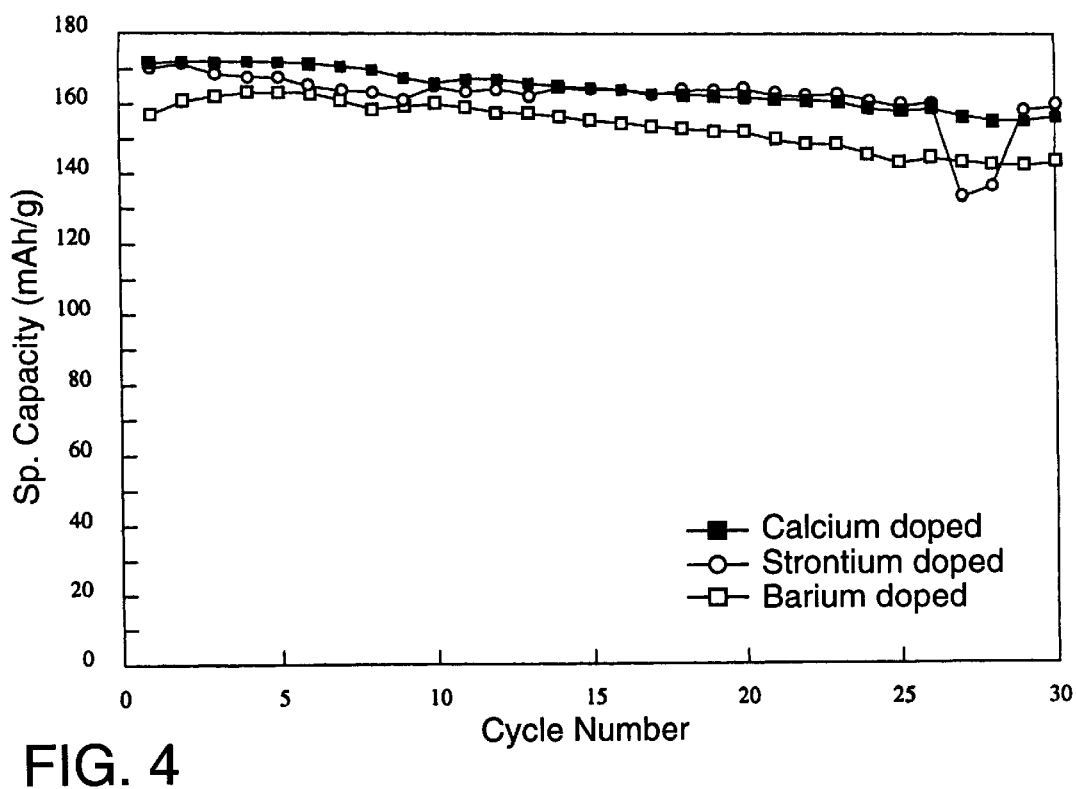
FIG. 4 is a plot of specific capacity versus cycle number for an electrochemical cell including as the cathode material $LiNi_{0.75}Co_{0.25}N_{0.03}O_p$ ($2.03 \leq p \leq 2.06$) synthesized by gelation, wherein N is calcium (—■—), strontium (—□—), or barium (—○—), as indicated.

$LiNi_{0.75}Co_{0.25}N_{0.03}O_p$ ($2.03 \leq p \leq 2.06$, N=Ca, Ba, or Sr) Produced By Gelation Lithium nickel cobalt oxide materials doped with calcium, barium, and strontium were synthesized by the procedure described in Example 1 using 0.1 moles of lithium hydroxide monohydrate, 0.075 moles of nickel acetate tetrahydrate, 0.025 moles of cobalt acetate tetrahydrate, and 0.003 moles of calcium, barium, or strontium hydroxide as the starting materials. The gels obtained were dried by rotary evaporation and then heat treated at 800° C. for 2 hours in air. X-ray diffraction patterns obtained for the powders showed that the addition of calcium resulted in a single phase material, while the addition of strontium and barium resulted in minor phase impurities in the form of hydroxides. However, the X-ray diffraction patterns obtained for the strontium-and barium-containing materials show characteristic lattice parameters and peak intensity ratios indicating dissolution of strontium and barium into the lattice structure of the active materials, which is believed to be responsible for the improvement in the compounds' cycling behaviors, shown in FIG. 4. The calcium- and strontium-doped materials show a decrease in capacity of only 0.3% per cycle, while the barium-doped material shows a decrease in capacity of 0.4% per cycle.

EXAMPLE 3

Figure 5:
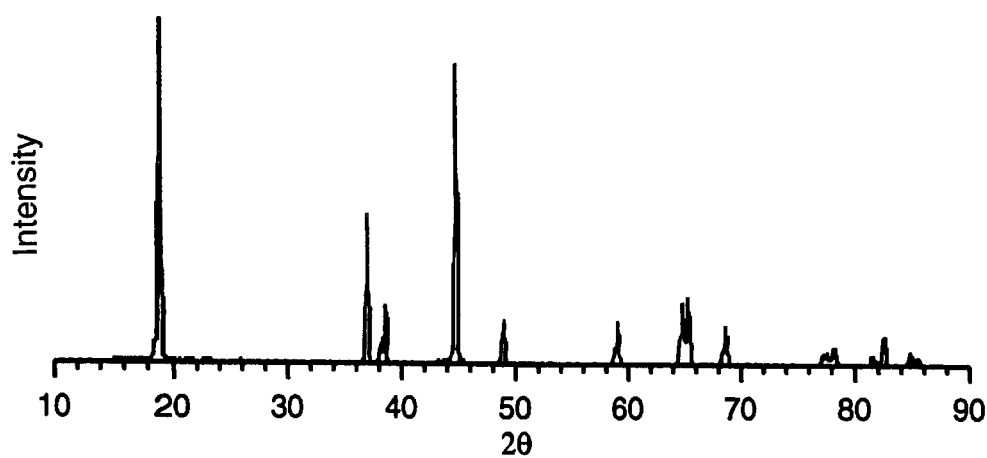
FIG. 5 is an X-ray diffraction pattern of the powdered compound $LiNi_{0.75}Co_{0.25}Mg_{0.03}O_p$ ($2.03 \leq p \leq 2.06$) synthesized by spray drying.
Figure 6:
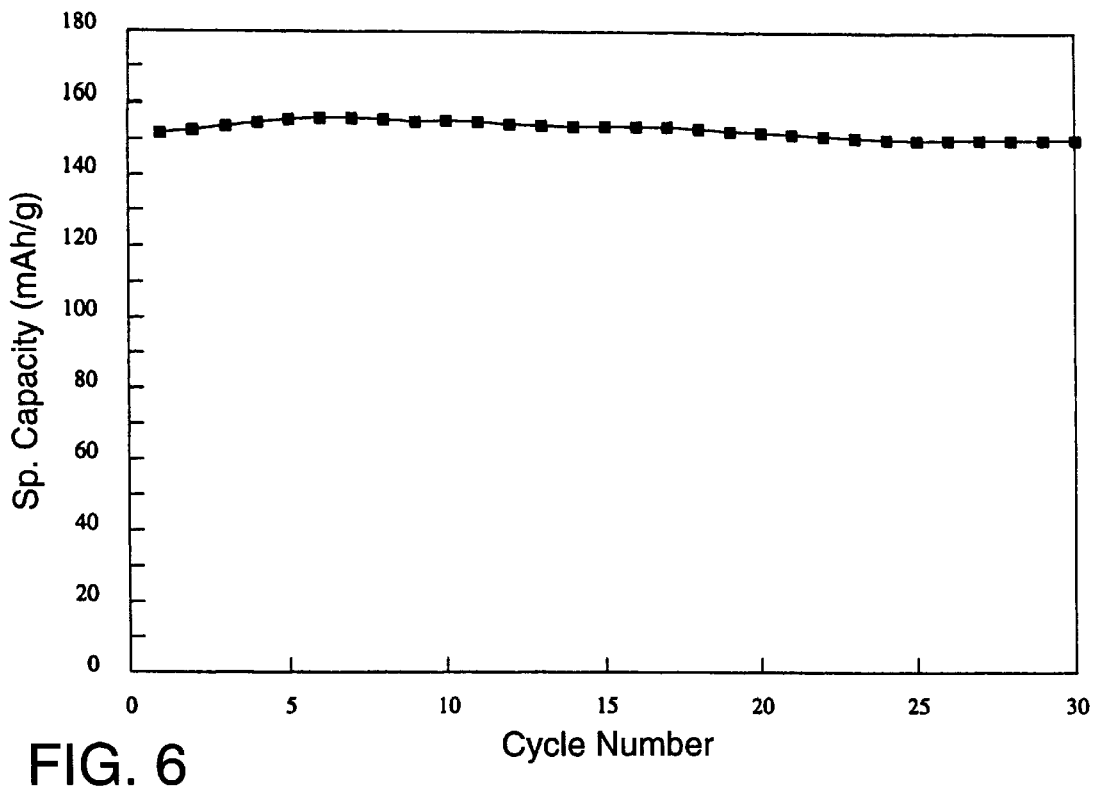
FIG. 6 is a plot of specific capacity versus cycle number for an electrochemical cell including as the cathode material $LiNi_{0.75}Co_{0.25}Mg_{0.03}O_p$ ($2.03 \leq p \leq 2.06$) synthesized by spray drying.

$LiNi_{0.75}Co_{0.25}Mg_{0.03}O_p$ ($2.03 \leq p \leq 2.06$) Produced By Spray Drying 0.15 moles of nickel (II) acetate tetrahydrate (Aldrich) and 0.05 moles of cobalt (II) acetate tetrahydrate were dissolved in 220 ml of methanol. Separately, 0.2 moles of lithium hydroxide (Aldrich) was dissolved in 100 ml of methanol. Also separately, 0.006 moles of magnesium hydroxide was dissolved in 400 ml water with the aid of 2 ml of 70% nitric acid to form a clear solution. Subsequently, the lithium hydroxide solution was added to the methanol solution containing the cobalt and nickel chemicals, resulting in the formation of a precipitate which redissolved upon stirring for 20 minutes. Prior to spray drying, the magnesium hydroxide solution in water was added to the methanol solution, which contained the lithium, cobalt, and nickel chemicals in the proper stoichiometry. The final solution remained clear and was spray dried using equipment set to the following parameters:

Peristaltic pump rate: 12–13 ml/minute
Atomizing gas: compressed air at 1.5 kfg/cm$^2$
Temperature of heated air for drying: 230° C.
Aspirator speed: 70–100 L/minute In order to provide an active material, the resulting powder was heated at 800° C. (furnace temperature) for 2 hours at temperature in stationary air using a heating and cooling rate of 2° C./minute. An advantage of the foregoing process is that powders exhibiting a high specific surface area, narrow particle size distribution, and small crystallite size may be synthesized. The heat-treated powders were characterized by X-ray diffraction and were evaluated for electrochemical performance after being formed as a cathode material in lithium-ion secondary batteries using the procedure described above. The X-ray diffraction pattern and cycling behavior of the material are shown in FIGS. 5 and 6, respectively. The X-ray diffraction pattern of FIG. 5 is characteristic of a single phase material exhibiting a layered R-3m structure. FIG. 6 shows that $LiNi_{0.75}Co_{0.25}Mg_{0.03}O_p$ material of the present invention has excellent cycling stability, exhibiting a decrease in capacity of only 0.1% per cycle over 30 cycles.

EXAMPLE 4

$LiNi_{0.75}Co_{0.25}Mg_{0.03}O_p$ ($2.03 \leq p \leq 2.06$) Synthesized By The Solid State Method 0.22 moles of lithium hydroxide monohydrate (formula weight=41.96, Aldrich) was first ground using an alumina mortar and pestle for 10 minutes to yield a fine powder. 0.0066 moles of magnesium hydroxide (formula weight= 58.33, Aldrich) was then added to the lithium hydroxide powder and ground for an additional 5 minutes. After careful grinding and mixing of the lithium hydroxide monohydrate and magnesium hydroxide, 0.165 moles of nickel (II) hydroxide (formula weight=92.73, Aldrich) and 0.055 moles of cobalt (II) hydroxide (formula weight=92.95, Aldrich) were added and further mixed and ground for an additional 15 to 20 minutes to yield a homogeneous powder. Acetone (30 ml) was added to this powder to obtain a paste which was mixed using a spatula and placed in an alumina crucible for heat treatment. The powders were heat treated in air for 2 hours at 750° C. X-ray diffraction patterns were then collected on the heat treated powders.

Figure 7:
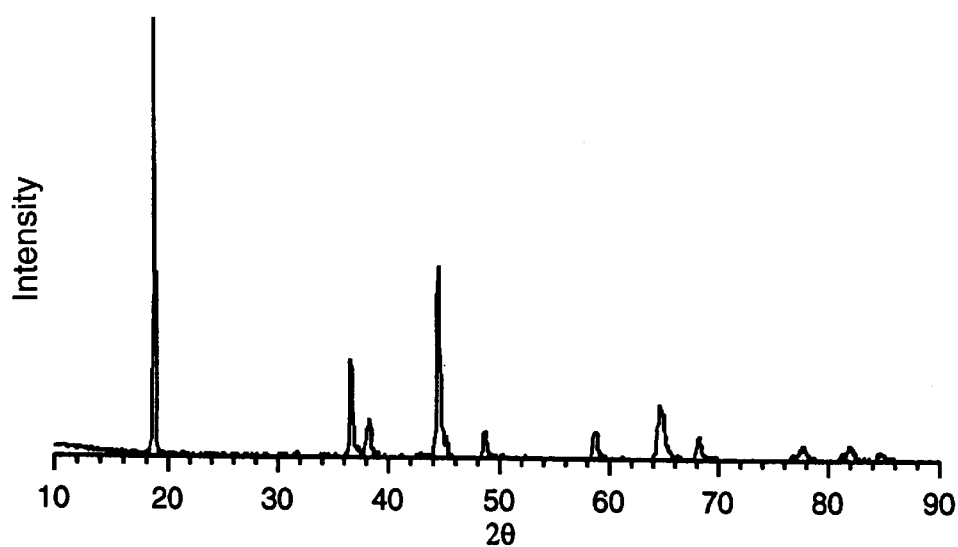
FIG. 7 is an X-ray diffraction pattern of the powdered compound $LiNi_{0.75}Co_{0.25}Mg_{0.03}O_p$ ($2.03 \leq p \leq 2.06$) synthesized by a solid state process.
Figure 8:
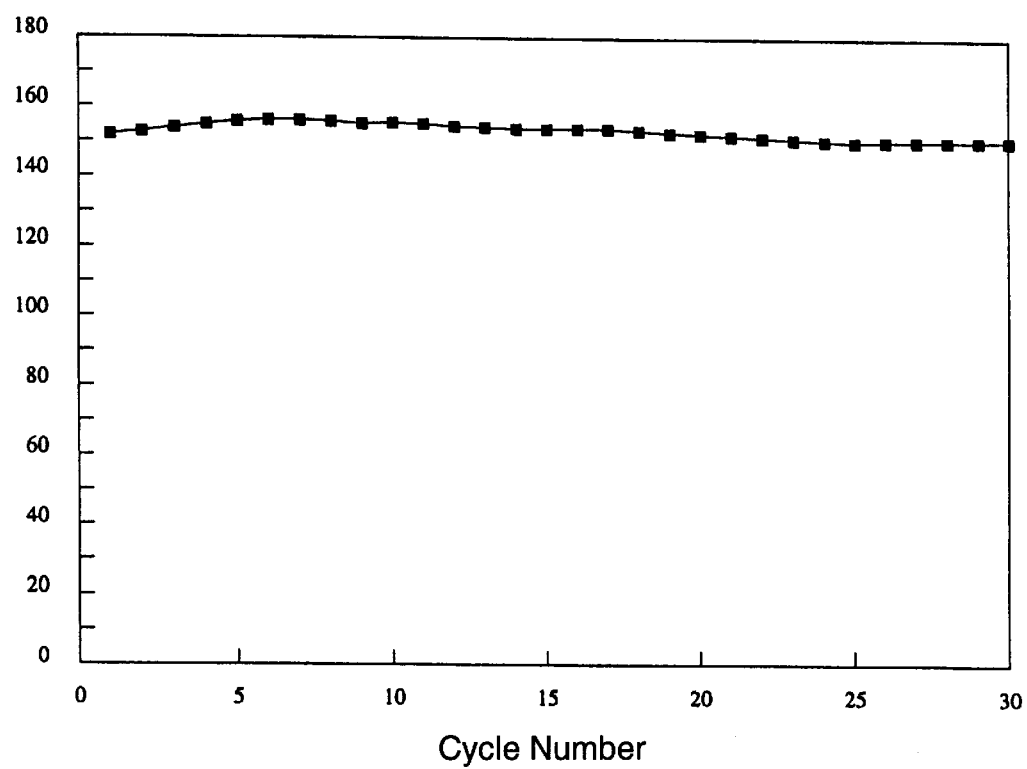
FIG. 8 is a plot of specific capacity versus cycle number for an electrochemical cell including LiNi$_{0.75}$Co$_{0.25}$Mg$_{0.03}$O$_p$ (2.03≦p≦2.06) synthesized by a solid state process.

Cathodes were fabricated and tested for their performance in lithium secondary batteries following the procedures utilized in the foregoing examples. The X-ray diffraction patterns and cycling stability of the material are shown in FIGS. 7 and 8, respectively. The x-ray diffraction pattern shown in FIG. 7 shows a single phase material having a crystal structure that is substantially identical to the materials manufactured in Example 1. The material shows an excellent cycling stability of about 0.08% per cycle.

EXAMPLE 5

Materials of the Invention With Varying Magnesium Levels

Phase pure materials of the present invention having the formula (I) compositions $Li_{1.03}Ni_{0.75}Co_{0.25}Mg_{0.03}O_{2.06}$, $Li_{1.05}Ni_{0.75}Co_{0.25}Mg_{0.05}O_{2.10}$, and $Li_{1.10}Ni_{0.75}Co_{0.25}Mg_{0.1}O_{2.2}$ were fabricated using suitable and stoichiometric amounts of the compounds LiOH, $Ni(OH)_2$, $Co(OH)_2$, and $Mg(OH)_2$, which were ground using a mortar and pestle, mixed together, and then suitably heat treated in a furnace at 750° C. for 5 to 10 hours. Specifically, the furnace (Lindberg Model 51524 box furnace) was heated to 750° C. at 2° C./minute, remained at temperature (750° C.) for 10 hours, and then cooled to room temperature at 2° C./minute. Stationary air was used in the furnace during heating. The powders were positioned in the furnace on an aluminum oxide crucible during heat treatment.

Figure 9A:
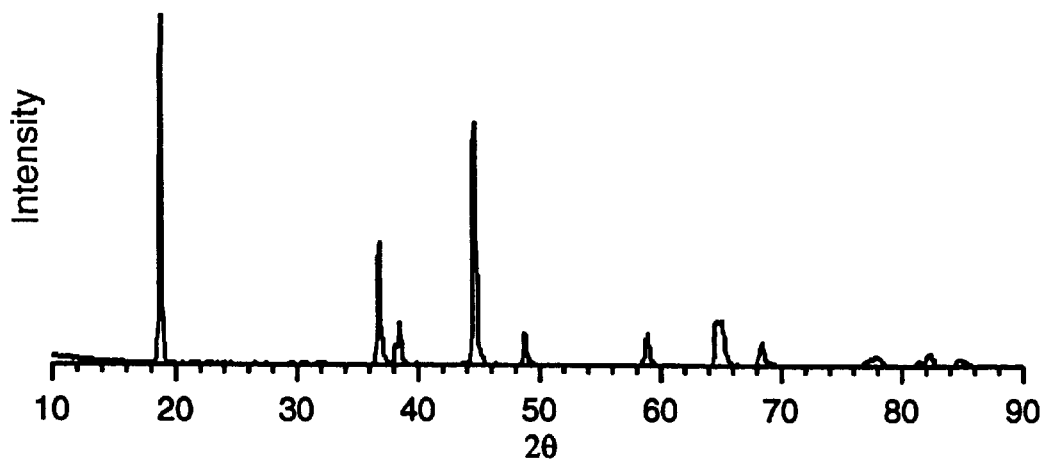
FIGS. 9(a)–(c) are X-ray diffraction patterns showing the phase-pure nature of the three oxides Li$_{1.03}$Ni$_{0.75}$Co$_{0.25}$Mg$_{0.03}$O$_{2.06}$, Li$_{1.05}$Ni$_{0.75}$Co$_{0.25}$Mg$_{0.05}$O$_{2.10}$, and Li$_{1.10}$Ni$_{0.75}$Co$_{0.25}$Mg$_{0.1}$O$_{2.2}$, respectively, synthesized by a solid state process.
Figure 9B:
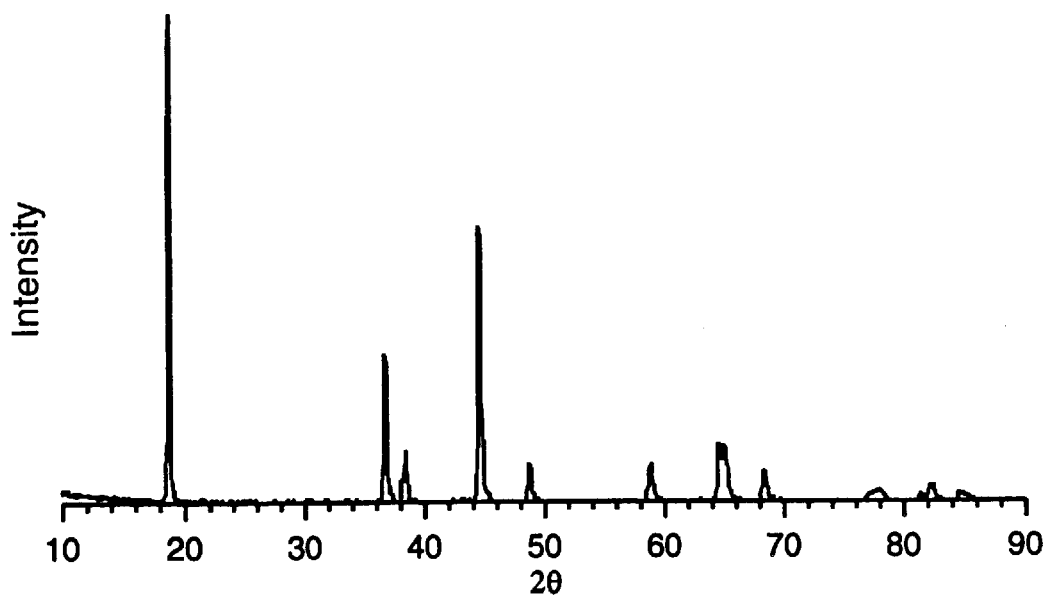
Figure 9C:
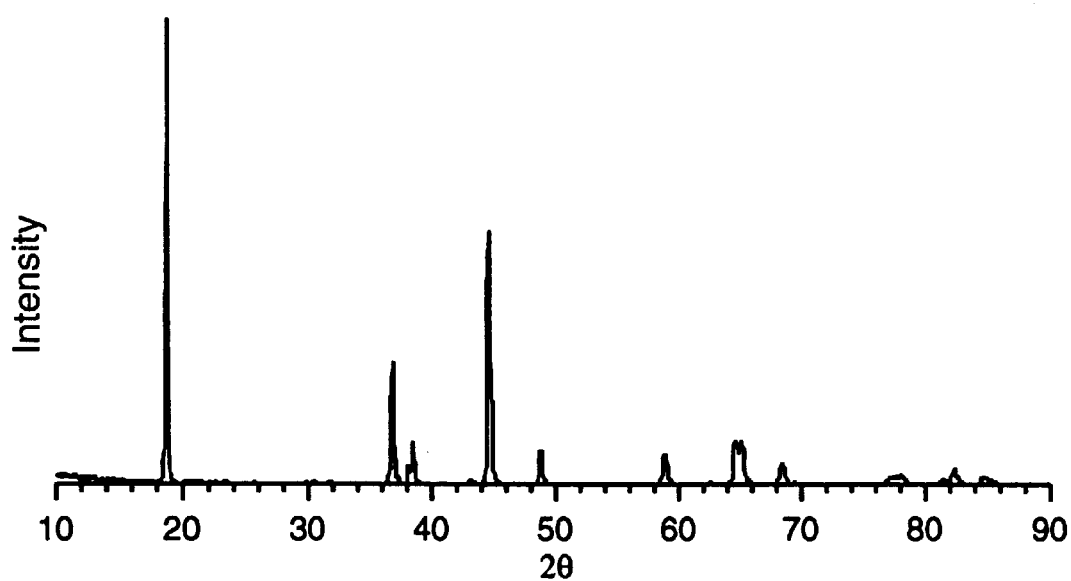

The X-ray diffraction patterns for the $Mg_{0.03}$, $Mg_{0.05}$, and $Mg_{0.1}$ materials, shown in FIGS. 9(*a*), 9(*b*), and 9(*c*), respectively, are characteristic of phase pure materials in the rhombohedral R-3m arrangement. The phase pure nature of the materials suggests that the divalent magnesium cations occupy transition metal sites, and not lithium sites, because the number of lithium sites is equal to the sum of nickel, cobalt, and magnesium.

The same process used to produce the phase pure materials described immediately above was used to synthesize three different magnesium-doped lithium nickel cobalt oxide materials of the invention having compositions within the general formula (II) above. The three compounds differed only in their magnesium contents. The nominal compositions of these materials along with the amounts of the different reactants used to produce each material are provided in Table 3 below.

TABLE 3

| Nominal composition of active material | Li-hydroxide (moles) | Ni-acetate (moles) | Co-acetate (moles) | Mg-hydroxide (moles) |
|---|---|---|---|---|
| $LiNi_{0.75}Co_{0.25}Mg_{0.05}O_{p1}$* | 0.1 | 0.075 | 0.025 | 0.005 |
| $LiNi_{0.75}Co_{0.25}Mg_{0.10}O_{p2}$* | 0.1 | 0.075 | 0.025 | 0.01 |
| $LiNi_{0.75}Co_{0.25}Mg_{0.20}O_{p3}$* | 0.1 | 0.075 | 0.025 | 0.02 |

Figure 10:
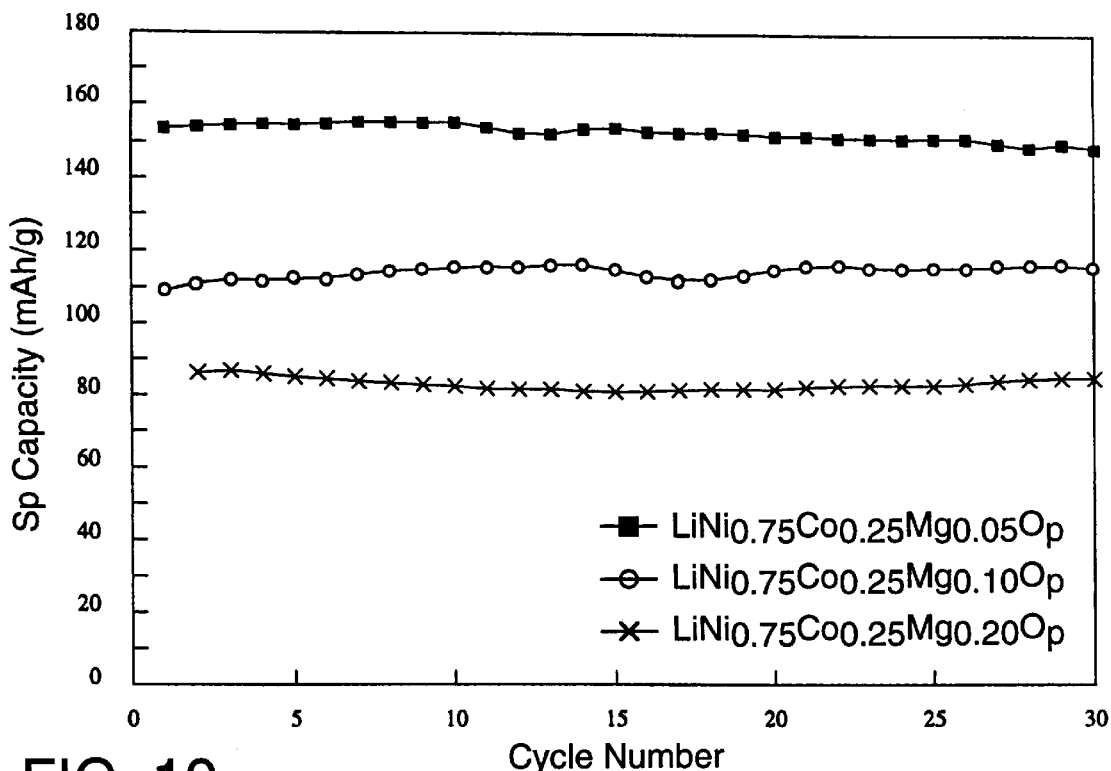
FIG. 10 is a plot of specific capacity versus cycle number for electrochemical cells including as the cathode material LiNi$_{0.75}$Co$_{0.25}$Mg$_{0.05}$O$_p$ (—■—), LiNi$_{0.75}$Co$_{0.25}$Mg$_{0.10}$O$_p$ (—□—), or LiNi$_{0.75}$Co$_{0.25}$Mg$_{0.20}$O$_p$ (—x—), each synthesized by a solid state process.

*$2.05 \leq p1 \leq 2.1$; $2.10 \leq p2 \leq 2.2$; and $2.20 \leq p3 \leq 2.4$;

Each of the materials shown in Table 3 exhibited X-ray diffraction patterns that are both characteristic of single phase materials and substantially identical to those of the materials produced in Example 1. The specific capacity of all three of these materials over thirty discharge-recharge cycles is shown in FIG. 10. The capacity of the materials decreases with increasing magnesium content. However, the cycling stability is maintained. FIG. 10 shows that the stability of capacity improves with increasing magnesium content, although there is a decrease in the absolute value of the capacity as magnesium content increases. A magnesium fraction of either 0.05 or 0.1 results in a capacity fade of 0.1% per cycle, while a magnesium stoichiometry of 0.2 produces a capacity fade of only 0.04% per cycle.

Further Characterization Of The Materials Of The Invention

U.S. Pat. No. 5,591,543, issued to Peled et. al, discloses a family of lithium-ion cathode materials of the composition $Li_{1-x}Q_{x/2}ZO_m$, wherein Z is a transition metal selected from cobalt, nickel, manganese, iron, and vanadium, Q is selected from the group II elements calcium, magnesium, strontium, and barium, and m is 2 or 2.5 depending on the identity of Z. The inventors of the '543 patent explain that a portion of the bivalent cations in the $Li_{1-x}Q_{x/2}ZO_2$ material occupy lithium sites in the crystalline lattice and that a portion of the bivalent cations are entrained in the material in the forms of oxides and carbonates, which act as an electrolyte desiccant upon dissolution during battery cycling The unique character of the present materials relative to the materials of '543 patent is immediately evident from the materials' differing atomic formulae. Also, all or a portion of the group II additives occupy sites in transition metal layers in the present invention's materials, while the '543 patent explains that the additives in that patent's materials occupy sites in lithium layers. The inventors have shown that the present materials may be charged up to 4.4 V without any significant decrease in fade. The materials of the '543 patent were only cycled up to 4.2 V. The 0.2 V difference is significant because, for example, the 0.2 V difference can cause a specific capacity difference of up to 30 mAh/g, and higher capacity and higher voltage implies a higher practical energy density for the material. Even an improvement of as little as 10 mAh/g may be significant. In the case of layered compounds, where the voltage versus charge curve typically is relatively flat at the high voltage end of the curve, an improvement of up to at least 30 mAh/g can be obtained by the present invention.

The materials of the present invention also have been shown to be substantially pure active phase materials. In contrast, the materials of the '543 patent includes entrained group II metal oxide or carbonate impurities, and the materials' cycling behavior has been ascribed by its inventors as possibly due to the electrolyte desiccating effect of the impurities. The inventors have determined that the presence of an oxide or carbonate phase is not necessary to achieve the improved cyclability of the active materials of the present invention. It is instead believed that the structural stability of the present materials' active phase may account for the materials improved electrochemical properties. The present inventors also have compared the capacity and capacity fade of the present invention's materials with those of the '543 patent and have shown a significant improvement in both capacity and cyclability in comparison to the '543 patent's materials.

The following Examples 6–10 provide a comparison of the materials of the present invention with those disclosed in the '543 patent and confirm that the foregoing differences exist.

EXAMPLE 6

Chemical Analyses $Li_{1.05}Ni_{0.75}Co_{0.25}Mg_{0.05}O_{2.10}$ and $Li_{1.10}Ni_{0.75}Co_{0.25}Mg_{0.1}O_{2.2}$ compounds of the present invention were synthesized using a solid state process and then chemically analyzed (by Galbraith Labs Inc.) to determine the number of moles of oxygen, nickel, cobalt, and magnesium within the materials. Prior to being analyzed, each compound was dried under vacuum at 150° C. for 3 hours. The analytic results are shown in Table 4 below. Table 4 indicates that for each compound the number of oxygen sites equals approximately twice the sum of the nickel, cobalt, and magnesium sites. This confirms that substantially all of the group II cations added to the $Li_{1+x}Ni_{1-y}M_yN_xO_{2(1+x)}$ materials of the present invention occupy transition metal sites, and not lithium sites.

TABLE 4

| Composition Targeted For Synthesis | Analyzed Composition (weight %) | | Formula Suggested By Analysis |
|---|---|---|---|
| $Li_{1.05}Ni_{0.75}Co_{0.25}Mg_{0.05}O_{2.10}$ | Lithium | 6.89% | $Li_{0.996}(NiCo)_{1.00}Mg_{0.045}O_{2.096}$ |
| | Nickel | 43.90% | |
| | Cobalt | 14.68% | |
| | Magnesium | 1.09% | |
| $Li_{1.10}Ni_{0.75}Co_{0.25}Mg_{0.1}O_{2.2}$ | Lithium | 6.91% | $Li_{1.028}(NiCo)_{1.00}Mg_{0.093}O_{2.196}$ |
| | Nickel | 42.70% | |
| | Cobalt | 14.18% | |
| | Magnesium | 2.19% | |

EXAMPLE 7

Charge and Discharge Curves

Figure 11:
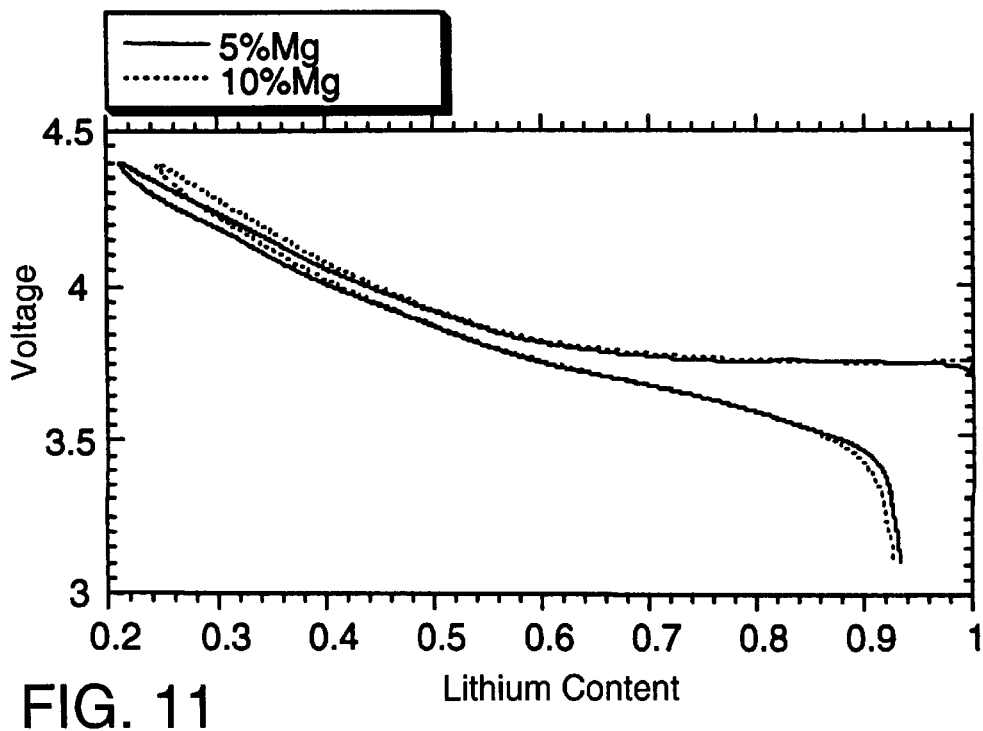
FIG. 11 is a plot of open circuit voltage versus lithium content experienced during charge and discharge cycles for the materials Li$_{1.05}$Ni$_{0.75}$Co$_{0.25}$Mg$_{0.05}$O$_{2.10}$ and Li$_{1.10}$Ni$_{0.75}$Co$_{0.25}$Mg$_{0.1}$O$_{2.2}$.

The charge and discharge curves of $Li_{1.05}Ni_{0.75}Co_{0.25}Mg_{0.05}O_{2.10}$ and $Li_{1.10}Ni_{0.75}Co_{0.25}Mg_{0.1}O_{2.2}$ materials of the present invention are depicted in FIG. 11. Constant current with current density of 10 $\mu A/cm^2$ and a test cycle between 3.1 to 4.4 V were used to obtain the curves. Since the current was small, the voltage detected by the potentiostat should be close to the open circuit voltage as indicated by the equation:

$$V_{detected} = V_{open\ circuit} + IR$$

I= the current passed to the material

R= the resistance of the material $V_{detected} = V_{open\ circuit}$ when I is very small FIG. 11 shows that at the same lithium content (indicated along the x-axis), the voltage level is greater with an increased amount of magnesium. This relationship indicates that the oxidation state of the transition metal cations, which is reflected by the voltage detected (for example, 3.8 V for $Ni^{3+}$ in $LiNiO_2$, and 4.5 V for $Ni^{4+}$ in $NiO_2$), increases as more divalent cations are added to the materials of the invention. The oxidation state of the transition metal may only increase when the divalent cations occupy the transition metal sites. Thus FIG. 11 further confirms that the divalent cations in the $Li_{1+x}Ni_{1-y}M_yN_xO_{2(1+x)}$ materials of the invention occupy transition metal sites.

EXAMPLE 8

Divalent Cation Content In Cathodes Before And After Cycling

The magnesium contents in cathodes fabricated from $Li_{1.03}Ni_{0.75}Co_{0.25}Mg_{0.03}O_{2.06}$, $Li_{1.05}Ni_{0.75}Co_{0.25}Mg_{0.05}O_{2.10}$, and $Li_{1.10}Ni_{0.75}Co_{0.25}Mg_{0.10}O_{2.20}$ materials of the present invention were determined before and after cycling by comparing the magnesium content in an untested and uncycled cathode with another cathode tested for 30 cycles (30 charge and discharge procedures) using energy dispersive spectroscopy (EDX). The EDX results are shown in Table 5. Negligible or no loss in magnesium content was observed for the doped cathodes after cycling. The results strongly suggest that group II elements are not lost from the materials on cycling. This is in contrast to the materials of the '543 patent, which as a characteristic of their mode of operation lose group II elements into the electrolyte in the form of dissolved alkaline earth carbonates and oxides during cycling.

TABLE 5

| Composition | Measurement Taken | EDX Results (Atomic %) |
|---|---|---|
| $Li_{1.03}Ni_{0.75}Co_{0.25}Mg_{0.03}O_{2.06}$ | Before Cycling | Mg: 4.47% Co: 23.45% Ni: 72.07% |
| | After Cycling | Mg: 5.02% Co: 23.58% Ni: 71.40% |
| $Li_{1.05}Ni_{0.75}Co_{0.25}Mg_{0.05}O_{2.10}$ | Before Cycling | Mg: 8.98% Co: 24.06% Ni: 66.97% |
| | After Cycling | Mg: 7.81% Co: 23.50% Ni: 68.69% |
| $Li_{1.10}Ni_{0.75}Co_{0.25}Mg_{0.10}O_{2.20}$ | Before Cycling | Mg: 12.89% Co: 22.24% Ni: 64.87% |
| | After Cycling | Mg: 12.53% Co: 21.54% Ni: 65.93% |

EXAMPLE 9

Divalent Cation Content In Electrolyte Before And After Cycling

The magnesium content in the electrolyte (11.49 weight % $LiPF_6$, 29.39 weight % dimethyl carbonate, and 59.11 weight % ethylene carbonate) before and after cycling of secondary cells incorporating the cathode materials listed in Table 5 was determined by chemical analysis up to ppm levels. The results of the chemical analyses are shown in Table 6. As with the cathode itself, only negligible differences in the magnesium content of the electrolyte after cycling were found, even after testing the electrodes for 30 cycles. This result confirms that magnesium and other divalent cations occupy the transition metal sites in $Li_{1+x}Ni_{1-y}M_yN_xO_{2(1+x)}$ materials and cannot be extracted from the cathode into the electrolyte during cycling.

TABLE 6

| Composition of Cathode Test Item | Magnesium Content of Electrolyte (ppm) |
|---|---|
| Initial Electrolyte | 5.7 |
| Electrolyte After 30 Cycles -- $Li_{1.03}Ni_{0.75}Co_{0.25}Mg_{0.03}O_{2.06}$ Cathode | 7.9 |
| Electrolyte After 30 Cycles -- $Li_{1.05}Ni_{0.75}Co_{0.25}Mg_{0.05}O_{2.10}$ Cathode | 7.3 |
| Electrolyte After 30 Cycles -- $Li_{1.10}Ni_{0.75}Co_{0.25}Mg_{0.10}O_{2.20}$ Cathode | 7.1 |

The slight increase in the magnesium content of the electrolyte after cycling shown in Table 6 is not believed to originate from the cathode materials. Moreover, the presence of the additional magnesium in the electrolyte upon cycling is not believed to account for the improved cyclability of the tested materials. First, the original magnesium content of the electrolyte could not eliminate the fade characteristics of the materials without the addition of divalent citations. Second, increases in the magnesium content originating from the cathode materials would be substantially greater than the small increases detected by the chemical analyses. For example, in the case of $Li_{1.10}Ni_{0.75}Co_{0.25}Mg_{0.1}O_{2.22}$, the weight of the electrolyte used was 1.0753 grams and the weight of the cathode used in the test cell was 0.0112 gram. The weight of active material in the cathode was $4.7883\times10^{-3}$ gram, and the weight of magnesium in the active material would have been approximately $1.1025\times10^{-4}$ g. If all of the magnesium leached into the electrolyte, the magnesium content detected should have been about 102.53 ppm ($1.1025\times10^{-4}$ gram÷1.0753 gram). However, the difference in magnesium in the electrolyte before and after cycling was only 1.4 ppm, which corresponds to approximately 1% of the total amount of magnesium content in the cathode material. Thus, it is likely the case that no magnesium passed from the cathodes into the electrolyte during cycling.

The inventors believe that the measured slight increase in magnesium content may be due to the experimental error range of the analysis technique. If the increase in magnesium content in the electrolyte did not arise fully from experimental error, then the source of the additional magnesium may be the structural parts of the assembled cell, which were reused and had been cleaned with detergent powders containing one or more magnesium compounds.

As stated in the '543 patent, the inventors of the '543 patent believe that dissolution of compounds of group II elements into the electrolyte during charging may result in the improved cycling behavior of the materials disclosed in that patent. The above results show that the change in the magnesium content of the electrolyte in multiply-cycled cells according to the present invention is within experimental error and is not due to dissolution of divalent cations from the cathode into the electrolyte. Thus, the improvement in capacity retention of the present materials is not due to dissolution of the group II elements, but rather is likely a result of the enhanced structural stability of the present materials.

EXAMPLE 10

TGA Analysis Of Weight Loss

The weight loss of starting precursors during heat treatment was used to ascertain the crystal lattice positions occupied by the divalent cations in the materials of the present invention. If, for example, magnesium ions occupy nickel or cobalt sites, as in the present invention, the stoichiometry of oxygen will be twice the sum of the stoichiometry of nickel, cobalt, and magnesium as well as twice the stoichiometry of lithium, based on the theoretical atomic site ratio of 1:1:2 for Li:Ni(or Co):O. On the other hand, if magnesium cations occupy lithium sites, as in the invention of the '543 patent, the stoichiometry of oxygen will be twice the sum of the stoichiometry of nickel and cobalt only. That is because the amount of lithium, according to the '543 patent, should be substituted by divalent cations based on consideration of charge balance wherein two lithium ions are replaced by one divalent cation, such as magnesium. By taking Ni:Co:Mg equal to 0.75:0.25:0.1 as an illustration case, the chemical formula where all magnesium cations sit on nickel (or cobalt) sites will be $Li_{1.10}Ni_{0.75}CO_{0.25}Mg_{0.1}O_{2.2}$. In contrast, if all magnesium cations occupy lithium sites, the suitable chemical formula should be $Li_{0.8}Ni_{0.75}CO_{0.25}Mg_{0.1}O_2$ based on considerations of site ratio and charge balance. Thus, solid state methods using $LiOH \cdot H_2O$, $Ni(OH)_2$, $Co(OH)_2$ and $Mg(OH)_2$ as starting compounds should reveal whether the chemical formula $Li_{1.10}Ni_{0.75}CO_{0.25}Mg_{0.1}O_{2.2}$ proposed in the present invention is valid. The solid state methods should also reveal any structural difference between that compound and the compound $Li_{0.80}Ni_{0.75}Co_{0.25}Mg_{0.1}O_2$, which is a compound of the '543 patent wherein the divalent cationic dopant is an atomic fraction of 0.1 magnesium.

The theoretical weight losses occurring during synthesis of the two compounds can be calculated by the following method. With respect to $Li_{1.10}Ni_{0.75}Co_{0.25}Mg_{0.1}O_{2.2}$, synthesizing one mole theoretically requires, for example, 1.1 moles $LiOH \cdot H_2O$, 0.75 mole $Ni(OH)_2$, 0.25 mole $Co(OH)_2$, and 0.1 mole $Mg(OH)_2$, as follows:

1.1 LiOH•H₂O + 0.75 Ni(OH)₂ + 0.25 Co(OH)₂ + 0.1 Mg(OH)₂ +

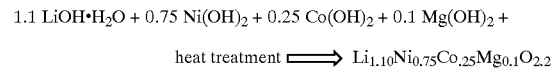

For that reaction, 144.78 grams of starting materials theoretically should result in 104.015 grams of product, leaving a calculated weight loss of 28.16%. With respect to $Li_{0.80}Ni_{0.75}Co_{0.25}Mg_{0.1}O_2$, the similar reaction is as follows:

0.8 LiOH•H₂O + 0.75 Ni(OH)₂ + 0.25 Co(OH)₂ + 0.1 Mg(OH)₂ +

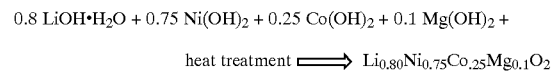

In that case, 132.188 grams of starting materials theoretically will yield 96.302 grams of product, resulting in a calculated weight loss of 27.15%.

Figure 12:
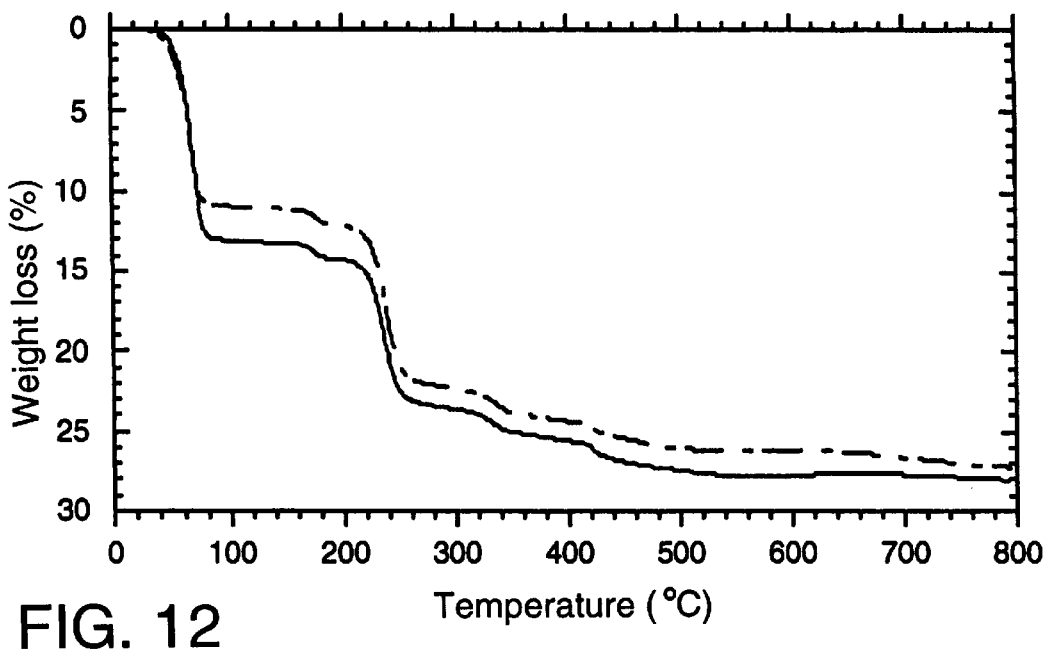
FIG. 12 is a plot of weight loss as determined by TGA versus temperature recorded during heat treatment of Li$_{1.10}$Ni$_{0.75}$Co$_{0.25}$Mg$_{0.1}$O$_{2.2}$ (solid line) and Li$_{0.80}$Ni$_{0.75}$Co$_{0.25}$Mg$_{0.1}$O$_2$ (dashed line)

The above two reactions were carried out in the laboratory and the actual weight loss plot measured by thermal gravitation analysis (TGA) is shown in FIG. 12. The actual overall weight changes between the starting compounds and the final products are tabulated in Table 6 below.

TABLE 6

| Chemical formula proposed | Weight of starting compounds | Weight of final product | Weight change observed (%) | Weight change calculated (%) |
|---|---|---|---|---|
| $Li_{1.10}Ni_{0.75}Co_{0.25}Mg_{0.1}O_{2.2}$ | 19.6641 mg | 14.1479 mg | 28.05 | 28.16 |
| $Li_{0.80}Ni_{0.75}Co_{0.25}Mg_{0.1}O_2$ | 18.7807 mg | 13.6665 mg | 27.23 | 27.15 |

The TGA results of Table 6 confirm that the proposed chemical formula $Li_{1.10}Ni_{0.75}Co_{0.25}Mg_{0.1}O_{2.2}$ of a material of the present invention is correct. The TGA analysis also unequivocally detected the structural differences between the $Li_{1.10}Ni_{0.75}Co_{0.25}Mg_{0.1}O_{2.2}$ material of the invention and the $Li_{0.80}Ni_{0.75}Co_{0.25}Mg_{0.1}O_2$ material of the '543 patent by measuring the different weight losses during heat treatment. By confirming the formulae of the materials, the weight loss differences also confirm the differences in the positions of the materials' divalent cations. Thus, the TGA analysis also confirms that the positioning of the divalent cations can be influenced by the amount of lithium added as a starting material and, consequently, corroborates the structural differences between the materials of the present invention and of the '543 patent.

EXAMPLE 11

Comparison Of Electrochemical Performance

Figure 13:
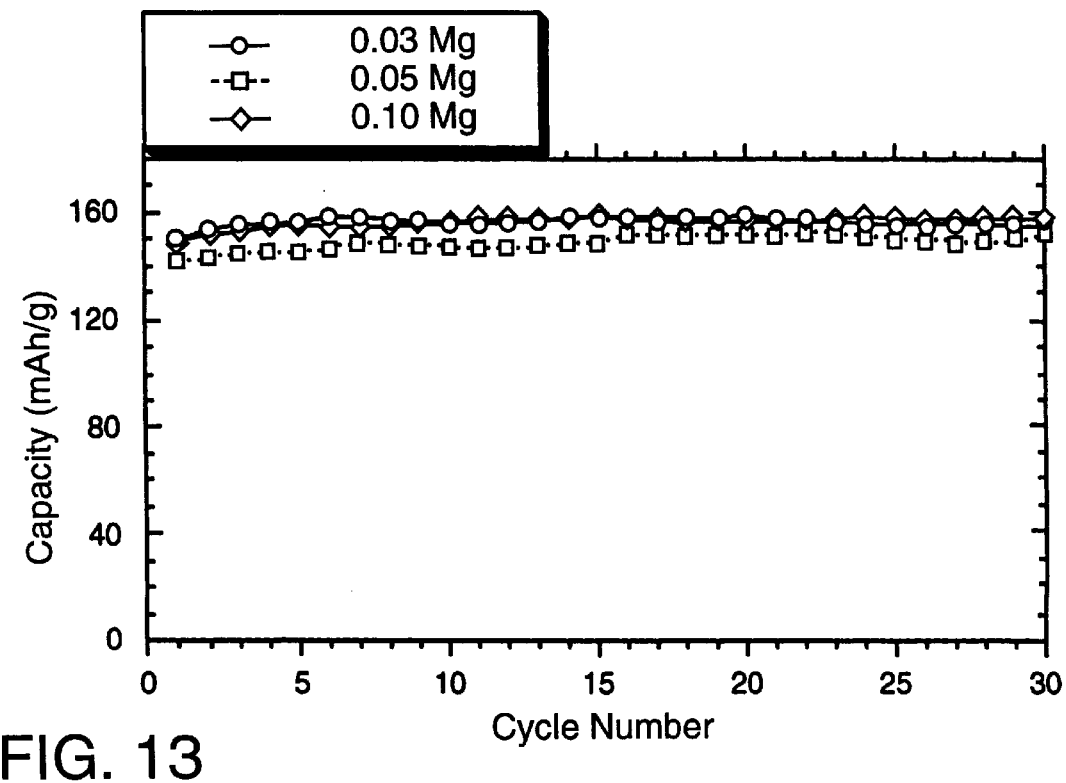
FIG. 13 is a plot of specific capacity versus cycle number for electrochemical cells including as the cathode material Li$_{1.03}$Ni$_{0.75}$Co$_{0.25}$Mg$_{0.03}$O$_{2.06}$, Li$_{1.05}$Ni$_{0.75}$Co$_{0.25}$Mg$_{0.05}$O$_{2.10}$, and Li$_{1.10}$Ni$_{0.75}$Co$_{0.25}$Mg$_{0.1}$O$_{2.2}$.

The electrochemical performance of the materials $Li_{1.03}Ni_{0.75}Co_{0.25}Mg_{0.03}O_{2.06}$, $Li_{1.05}Ni_{0.75}Co_{0.25}Mg_{0.05}O_{2.10}$, and $Li_{1.10}Ni_{0.75}Co_{0.25}Mg_{0.10}O_{2.20}$ considered in Example 5 is provided in graphical form in FIG. 13. All three materials exhibited excellent cyclability and high capacity (in excess of 150 mAh/g).

EXAMPLE 12

Synthesis and Electrochemical Characterization of $Li_{1.15}NiMg_{0.15}O_{2.3}$ Conventional solid state processing, described above, was used to synthesize this material of the present invention from stoichiometric amounts of the starting materials LiOH•$H_2O$, $Ni(OH)_2$, and $Mg(OH)_2$. The starting materials were ground and mixed together using a mortar and pestle, placed on an alumina crucible, and then heat treated in air in a furnace at 800° C. for 10 hours.

Figure 14:
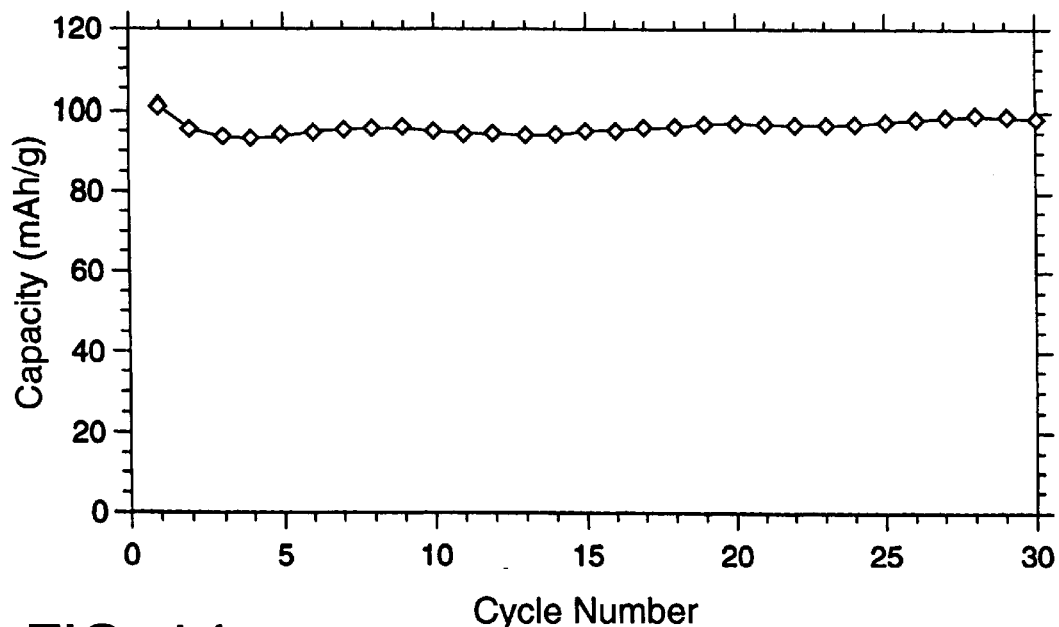
FIG. 14 is a plot of capacity versus cycle number for the material Li$_{1.15}$NiMg$_{0.15}$O$_{2.3}$.
Figure 15:
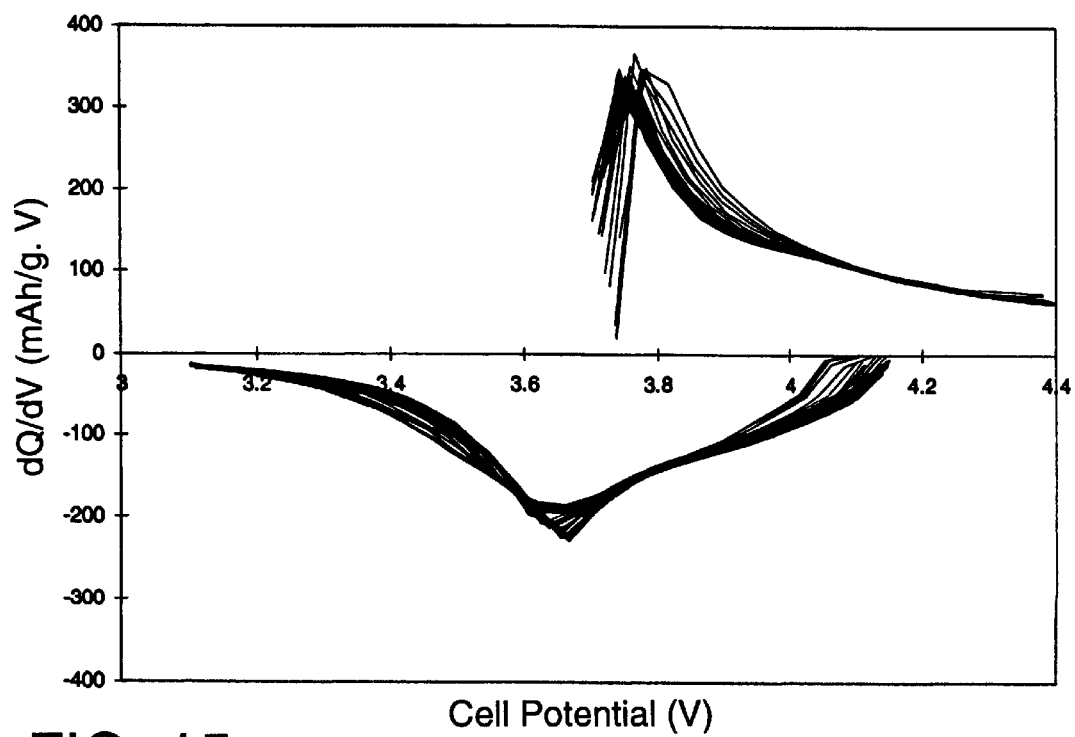
FIG. 15 is a plot of dQ/dV versus cell potential (V) for the material Li$_{1.15}$NiMg$_{0.15}$O$_{2.3}$.
Figure 16:
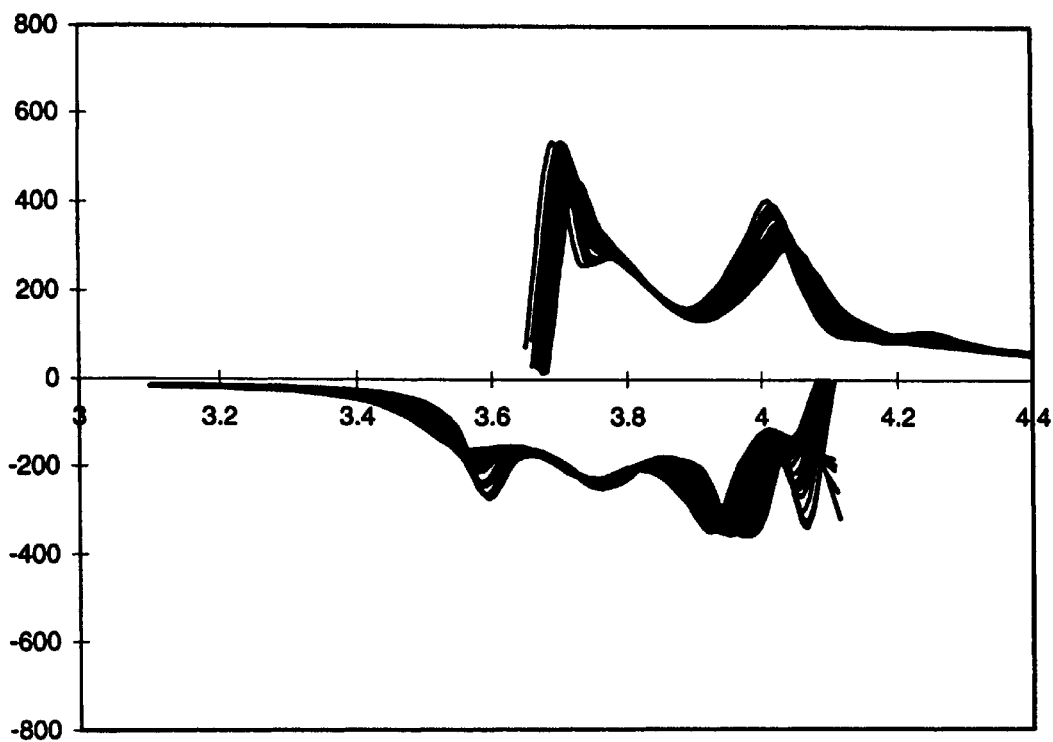
FIG. 16 is a plot of dQ/dV versus cell potential (V) for the prior art material LiNiO$_2$.

The material's electrochemical properties are illustrated in FIGS. 14 and 15. FIG. 14 shows the capacity of the material as a function of cycle number. The figure demonstrates that the material does not fade for the first thirty cycles, which is not a normal observation for an undoped $LiNiO_2$ (i.e., $LiNiO_2$ without group II elements). In order to investigate the differences between $LiNiO_2$ materials with and without the addition of group II elements, the dQ/dV for the materials as a function of V (cell potential) are shown in FIGS. 15 and 16, respectively. FIG. 15, which represents the dQ/dV versus V curves for a $Li_{1.15}NiMg_{0.15}O_{2.3}$ material of the present invention, shows that the material does not undergo any phase transformation during cycling, which significantly differs from the undoped $LiNiO_2$ material shown in FIG. 16, which does undergoes phase transitions during cycling.

EXAMPLE 13

Electrochemical Performance of $Li_{1.10}N_{0.75}Co_{0.25}Mg_{0.10}O_{2.2}$

Electrochemical cells including cathodes of $Li_{1.10}Ni_{0.75}Co_{0.25}Mg_{0.10}O_{2.2}$ material of the invention and coke or lithium anodes were constructed according to the procedure described above. Test cells constructed in this way were tested under several different experimental conditions as follows.

Figure 17:
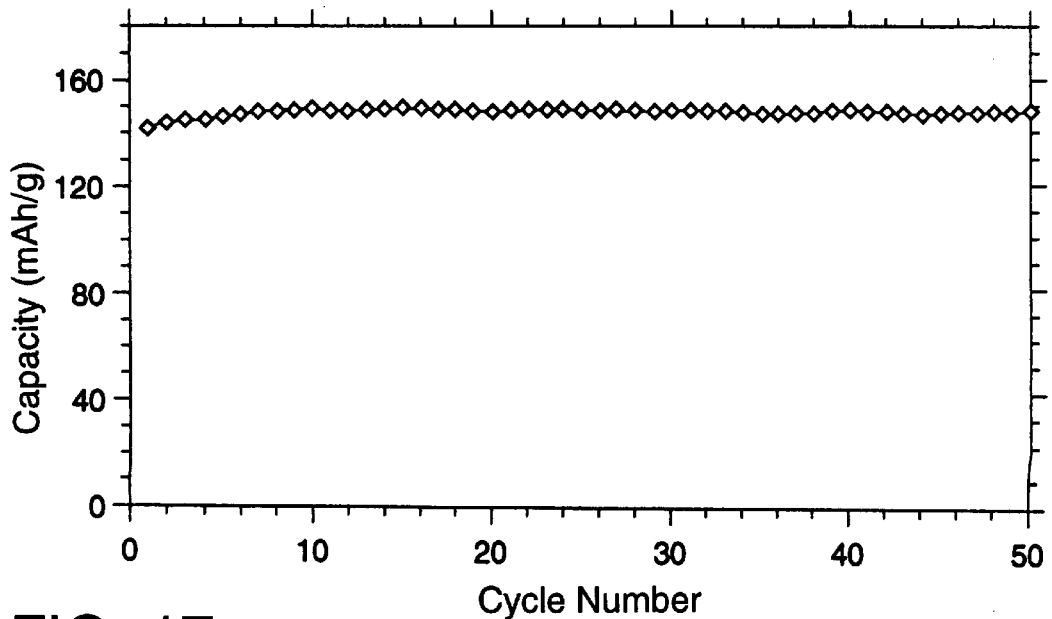
FIG. 17 is a plot of capacity versus cycle number for an electrochemical cell including Li$_{1.10}$Ni$_{0.75}$Co$_{0.25}$Mg$_{0.10}$O$_{2.2}$ as the cathode material and a coke anode, cycled between 3.1 and 4.4 V for 50 cycles at 0.50 mA/cm$^2$.

In a first test, a test cell including a coke anode was cycled between 3.1 and 4.4 V for 50 cycles at a current density of 0.50 mA/cm². FIG. 17 plots the capacity of the cell as a function of cycle number. The figure demonstrates that long cycle life may be obtained from electrochemical cells including the materials of the invention.

Figure 18:
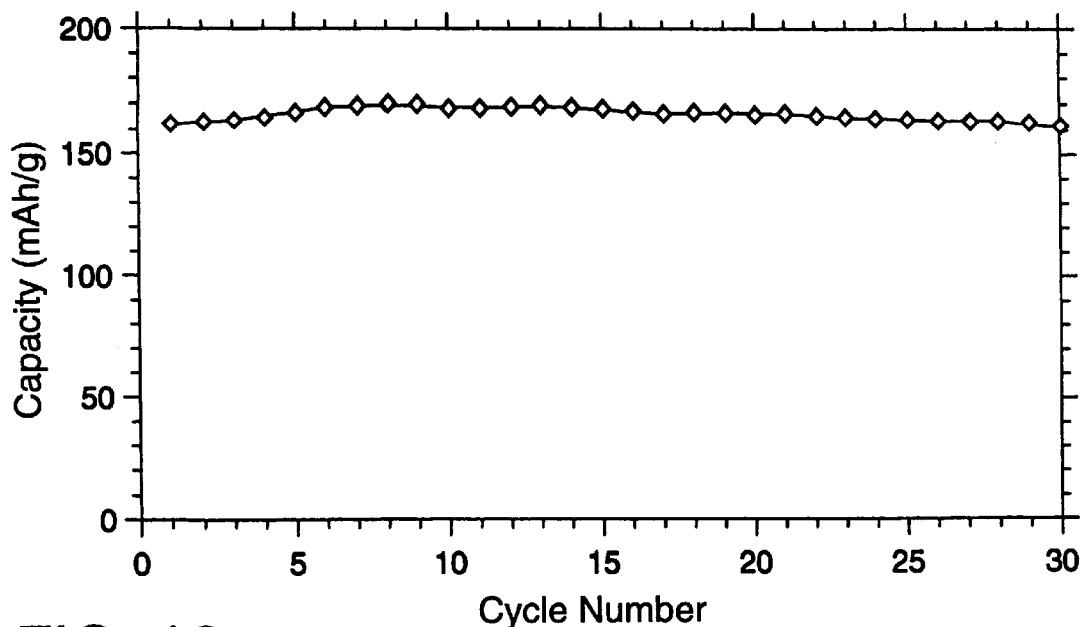
FIG. 18 is a plot of capacity versus cycle number for an electrochemical cell including Li$_{1.10}$Ni$_{0.75}$Co$_{0.25}$Mg$_{0.10}$O$_{2.2}$ as the cathode material and a lithium anode, cycled between 3.1 and 4.6 V for 30 cycles at 0.50 mA/cm$^2$.

In a second test, a test cell including a lithium anode was cycled between 3.1 and 4.6 V for 30 cycles at 0.50 mA/cm². FIG. 18 plots the cell's capacity as a function of cycle number. The figure demonstrates that cells including the materials of the invention show superior voltage durability, with little or no fade when cycled to high voltages.

Figure 19:
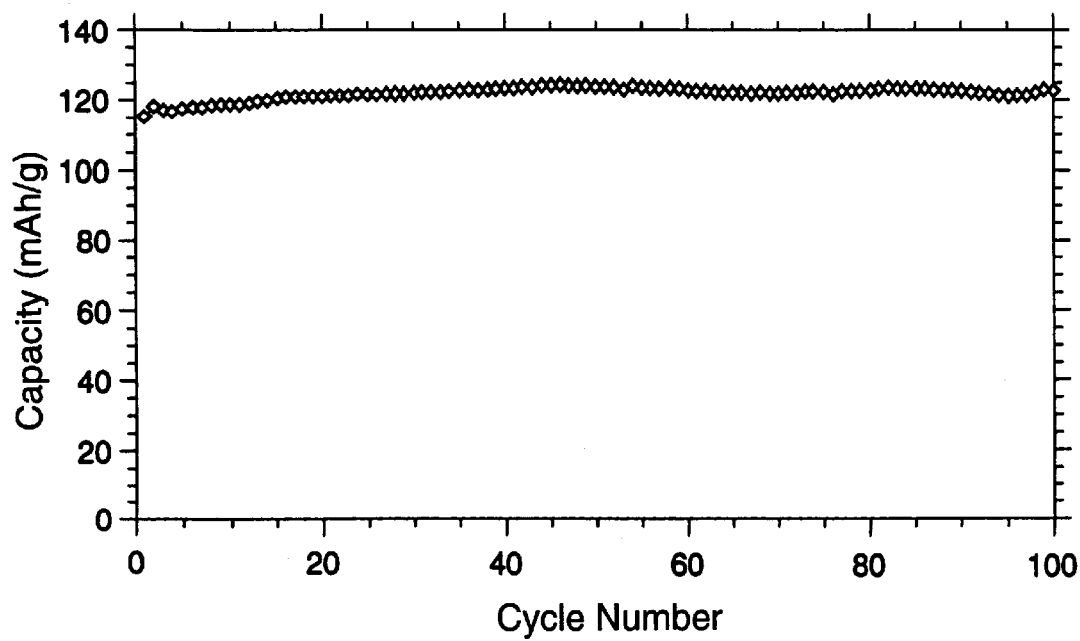
FIG. 19 is a plot of capacity versus cycle number for an electrochemical cell including Li$_{1.10}$Ni$_{0.75}$Co$_{0.25}$Mg$_{0.10}$O$_{2.2}$ as the cathode material and a lithium anode, cycled between 3.1 and 4.4 V for 100 cycles at 2.0 mA/cm$^2$.

In a third test, a test cell including a lithium anode was cycled between 3.1 and 4.4 V for 100 cycles at 2.0 mA/cm². FIG. 19 plots the cell's capacity as a function of cycle number. The figure demonstrates that cells including the cathode materials of the invention maintain good cyclability even when cycled under ultra high current density. The test cell could be charged or discharged completely in 15–20 minutes, which is approximately equal to a C-rate of 4C. Such high performance is unusual in that high current density usually is not accompanied by high capacity and good cyclability. Thus, the family of materials of the present invention makes lithium batteries more feasible for use in vehicle applications.

The foregoing examples confirm that the general formula $Li_{1+x}Ni_{1-y}M_yN_xO_{2(1+x)}$ (formula I) is valid for one grouping of the materials of the invention. The foregoing examples also confirm the present inventors' theoretical conclusions that the divalent cations in that particular grouping (formula I) of materials occupy sites within the transition metal layers of the materials' crystal lattices and differ from the materials of the '543 patent in terms of formula, structure, and electrochemical properties.

The second grouping of materials of the present invention, having the formula $Li_1Ni_{1-y}M_yN_xO_p$ (formula II), also differ from the $Li_{1-x}Q_{x/2}ZO_m$ (formula III) materials of the '543 patent. The chemical compositions represented by the three formulae are different. In formula I, the number of lithium atoms equals the sum of the numbers of nickel, "M" transition metal, and "N" group II atoms. In formula II, the number of lithium atoms equals the sum of nickel and "M" transition metal atoms, while the number of "N" group II atoms is an independent parameter. In formula III, the number of lithium atoms is at all times less than the number of "Z" transition metal atoms (where Z is nickel, cobalt, manganese, or some combination of two or more) while the number of "Q" group IIA atoms is dependent on the number of lithium atoms.

Figure 20:
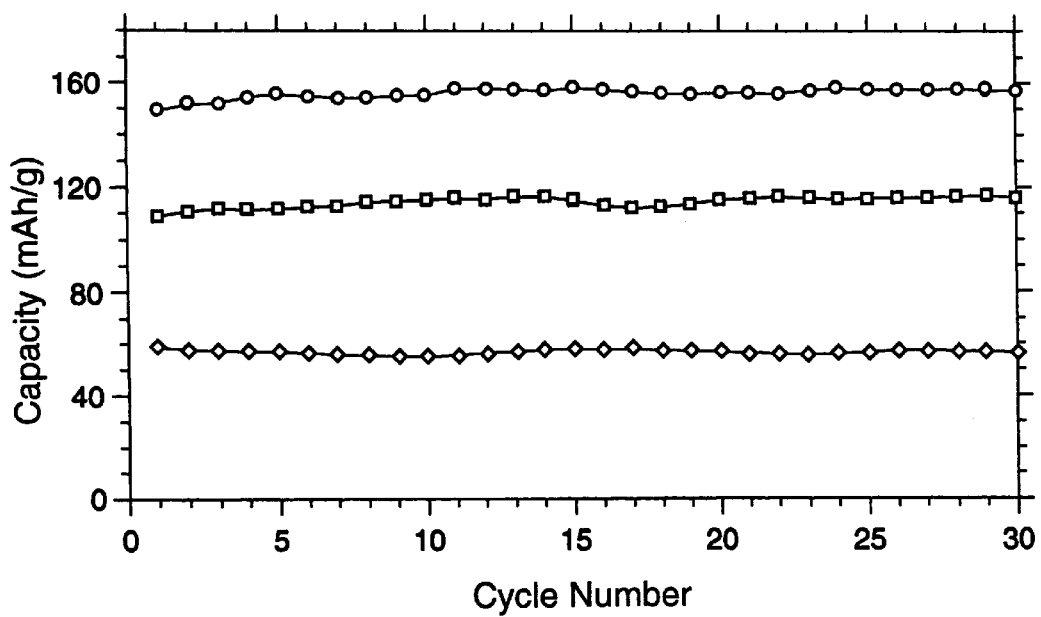
FIG. 20 is a plot of specific capacity versus cycle number for electrochemical cells including as the cathode material Li$_{1.10}$Ni$_{0.75}$Co$_{0.25}$Mg$_{0.01}$O$_{2.2}$, Li$_1$Ni$_{0.75}$Co$_{0.25}$Mg$_{0.10}$O$_p$ (2.1≦p≦2.2), and Li$_{0.08}$Ni$_{0.75}$Co$_{0.25}$Mg$_{0.1}$O$_{2.0}$.

With respect to the electrochemical properties of the foregoing materials, the formula I materials generally show the best performance, followed by the formula II materials. For example, as shown in FIG. 20, materials of formulae I and II of the present invention (having the compositions $Li_{1.10}Ni_{0.75}Co_{0.25}Mg_{0.10}O_{2.2}$ and $Li_1Ni_{0.75}Co_{0.25}Mg_{0.10}O_p$ (2.1≦p≦2.2), indicated by —O— and —□—, respectively) show a significant improvement in specific capacity over material of formula III of the '543 patent (having the composition $Li_{0.08}Ni_{0.75}Co_{0.25}Mg_{0.10}O_{2.0}$).

The positions occupied by the divalent cations in the formulae I, II, and III materials also differ. For example, in formula I, the number of oxygen sites is twice the number of lithium sites, as well as twice the sum of nickel plus "M" transition metal plus "N" group II element sites. In formula III, the number of oxygen sites is twice the sum of nickel plus "M" transition metal sites. The lithium sites in formula III are occupied by (1−x) of lithium plus x/2 of the "N" group II atom sites plus x/2 of vacancies. In Formula II the number of oxygen sites cannot be precisely predicted from the nominal formula. The number of oxygen sites may be 2(1+(x/2)) if x/2 of "N" group II cations occupy lithium sites and x/2 of group II cations occupy transition metal sites, or the number of oxygen sites may be 2(1+x) if all group II cations occupy transition metal sites and leave the number of lithium vacancies equal to x. In any case, at least x/2 of "N" group II cations occupy sites within transition metal layers in the materials of formula II and, based on the present investigation, the cycling properties of the formula II materials are believed to be a result of the positioning of group II cations on transition metal sites.

Accordingly, the materials encompassed by the present invention's formulae I and II may be considered to be included within a single group of materials of the general formula

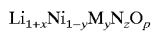

wherein:
M is selected from titanium, vanadium, chromium, manganese, iron, cobalt, and aluminum;
N is selected from magnesium, calcium, strontium, barium, and zinc;
$0 \leq x \leq z$;
$2(1+z/2) \leq p \leq 2(1+z)$;
$0 \leq y \leq 1$ when M is cobalt or manganese;
$0 \leq y \leq 0.5$ when M is titanium, vanadium, chromium, or iron;
$y \leq 0.4$ when M is aluminum;
$0 \leq z \leq 0.25$ when N is magnesium or calcium; and
$0 \leq z \leq 0.1$ when N is strontium, zinc, or barium.

The foregoing comparison of the materials of the present invention with those of the '543 patent should not be considered exhaustive, and it is believed that additional significant differences may be shown to exist between the various materials.

Accordingly, the present inventors have shown that adding controlled amounts of group II elements into transition metal sites within lithiated transition metal oxides exhibiting the layered R-3m structure results in new materials exhibiting improved cycling behavior and other advantageous electrochemical properties. The foregoing examples of the materials of the invention have principally utilized magnesium as the divalent cationic dopant and nickel and cobalt as the transition metals. However, based upon the reasoned expectation that, when added in an appropriate stoichiometry with lithium and the transition metals, such other divalent cations occupy transition metal sites in the R-3m, the scope of the present invention also contemplates the addition of those divalent cations. The interchangeable nature of magnesium, calcium, strontium, and barium is particularly apparent, and it is believed that their addition to the materials of the invention ought to be beneficial to a substantially like degree. The interchangeable nature of the transition metals, principally titanium, vanadium, chromium, manganese, iron, cobalt, and aluminum, also is presumed. Evidence of such compatibility is provided by way of, for example, the compounds of U.S. Pat. No. 5,264,201.

It will also be understood that various other modifications will be apparent to and can be readily made by those skilled in the art to which the invention pertains without departing from the scope and spirit of the invention. Accordingly, it is not intended that the scope of the appended claims be limited to the specific embodiments and other descriptions set forth herein, but rather that the claims be construed to encompass all of the patentable features of the present invention, including all features that would be treated as equivalents thereof by those skilled in the art.

We claim:

1. A crystalline material comprising atoms of lithium, oxygen, and at least one transition metal, the material further comprising divalent cations on sites within atom layers of the crystalline material including said atoms of said at least one transition metal.

2. The material recited in claim 1 wherein the material has a single phase R-3m crystal structure when lacking said divalent cations.

3. The material recited in claim 2 wherein a portion of said lithium atoms may be reversibly removed from said crystal structure.

4. The material recited in claim 3 wherein said atom layers including said transition metal atoms increase the oxidation state of transition metal ions within the material.

5. The material recited in claim 3 wherein said divalent cations are present in a range of from 1 to 25 atomic percent based on the overall number of atoms in said atom layers of the material including said transition metal atoms.

6. The material recited in claim 5 wherein said range is from 3 to 15 atomic percent.

7. The material recited in claim 3 wherein said divalent cations are ions selected from the group consisting of group II elements and zinc.

8. The material recited in claim 7 wherein said divalent cations are ions of alkaline earth elements.

9. The material recited in claim 8 wherein said alkaline earth elements are selected from the group consisting of magnesium, calcium, strontium, and barium.

10. The material recited in claim 3 wherein said transition metals are at least one selected from the group consisting of titanium, vanadium, chromium, manganese, iron, cobalt, and aluminum.

11. The material recited in claim 1 having the composition

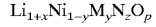

wherein:
M is selected from the group consisting of titanium, vanadium, chromium, manganese, iron, cobalt, and aluminum;
N is selected from the group consisting of magnesium, calcium, strontium, barium, and zinc;
$0 \leq x \leq z$;
$2(1+z/2) \leq p \leq 2(1+z)$;
$0 \leq y \leq 1$ when M is cobalt or manganese; $0 \leq y \leq 0.5$ when M is titanium, vanadium, chromium, or iron; and $y \leq 0.4$ when M is aluminum; and
$0 \leq z \leq 0.25$ when N is magnesium or calcium; and $0 \leq z \leq 0.1$ when N is strontium, zinc, or barium.

12. The material recited in claim 1 having the composition

wherein:
M is selected from the group consisting of titanium, vanadium, chromium, manganese, iron, cobalt, and aluminum;
N is selected from the group consisting of magnesium, calcium, strontium, barium, and zinc;
$0 \leq y \leq 1$ when M is cobalt or manganese; $0 \leq y \leq 0.5$ when M is titanium, vanadium, chromium, or iron; and $y \leq 0.4$ when M is aluminum; and
$0 \leq x \leq 0.25$ when N is magnesium or calcium; and $0 \leq x \leq 0.1$ when N is strontium, barium, or zinc.

13. The material recited in claim 1 having the composition

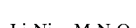

wherein:
M is selected from the group consisted of titanium, vanadium, chromium, manganese, iron, cobalt, and aluminum;
N is selected from the group consisting of magnesium, calcium, strontium, barium, and zinc;
$0 \leq y \leq 1$ when M is cobalt or manganese; $0 \leq y \leq 0.5$ when M is titanium, vanadium, chromium, or iron; and $y \leq 0.4$ when M is aluminum;

$0 \leq x \leq 0.25$ when N is magnesium or calcium; and
$0 \leq x \leq 0.1$ when N is strontium, barium, or zinc; and
$2(1+x/2) \leq p \leq 2(1+x)$.

14. A cathode for an electrochemical cell, the cathode comprising a crystalline material comprising atoms of lithium, oxygen, and at least one transition metal, said material further comprising divalent cations on sites within atom layers of said material including atoms of said at least one transition metal.

15. The cathode recited in claim 14, wherein said material has the composition

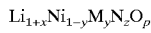

wherein:
M is selected from the group consisting of titanium, vanadium, chromium, manganese, iron, cobalt, and aluminum;
N is selected from the group consisting of magnesium, calcium, strontium, barium, and zinc;
$0 \leq x \leq z$;
$2(1+z/2) \leq p \leq 2(1+z)$;
$0 \leq y \leq 1$ when M is cobalt or manganese; $0 \leq y \leq 0.5$ when M is titanium, vanadium, chromium, or iron; and $y \leq 0.4$ when M is aluminum; and
$0 \leq z \leq 0.25$ when N is magnesium or calcium; and $0 \leq z \leq 0.1$ when N is strontium, zinc, or barium.

16. The cathode recited in claim 1, wherein said material has the composition

wherein:
M is selected from the group consisting of titanium, vanadium, chromium, manganese, iron, cobalt, and aluminum;
N is selected from the group consisting of magnesium, calcium, strontium, barium, and zinc;
$0 \leq y \leq 1$ when M is cobalt or manganese; $0 \leq y \leq 0.5$ when M is titanium, vanadium, chromium, or iron; and $y \leq 0.4$ when M is aluminum; and
$0 \leq x \leq 0.25$ when N is magnesium or calcium; and $0 \leq x \leq 0.1$ when N is strontium, barium, or zinc.

17. The cathode recited in claim 1, wherein said material has the composition

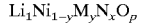

wherein:
M is selected from the group consisted of titanium, vanadium, chromium, manganese, iron, cobalt, and aluminum;
N is selected from the group consisting of magnesium, calcium, strontium, barium, and zinc;
$0 \leq y \leq 1$ when M is cobalt or manganese; $0 \leq y \leq 0.5$ when M is itanium, vanadium, chromium, or iron; and $y \leq 0.4$ when M is aluminum;
$0 \leq x \leq 0.25$ when N is magnesium or calcium; and $0 \leq x \leq 0.1$ when N is strontium, barium, or zinc; and
$2(1+x/2) \leq p \leq 2(1+x)$.

18. A lithium-ion secondary cell comprising:
a cathode comprising a crystalline material comprising atoms of lithium, oxygen, and at least one transition metal, said material further comprising divalent cations on sites within atom layers of said material including atoms of said at least one transition metal;
an anode that is compatible with said cathode; and
an electrolyte that is compatible with said cathode and said anode.

19. The lithium-ion secondary cell recited in claim 18, wherein said material has the composition

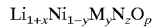

wherein:
M is selected from the group consisting of titanium, vanadium, chromium, manganese, iron, cobalt, and aluminum;
N is selected from the group consisting of magnesium, calcium, strontium, barium, and zinc;
$0 \leq x \leq z$;
$2(1+z/2) \leq p \leq 2(1+z)$;
$0 \leq y \leq 1$ when M is cobalt or manganese; $0 \leq y \leq 0.5$ when M is titanium, vanadium, chromium, or iron; and $y \leq 0.4$ when M is aluminum; and
$0 \leq z \leq 0.25$ when N is magnesium or calcium; and $0 \leq z \leq 0.1$ when N is strontium, zinc, or barium.

20. The lithium-ion secondary cell recited in claim 18, wherein said material has the composition

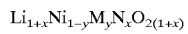

wherein:
M is selected from the group consisting of titanium, vanadium, chromium, manganese, iron, cobalt, and aluminum;
N is selected from the group consisting of magnesium, calcium, strontium, barium, and zinc;
$0 \leq y \leq 1$ when M is cobalt or manganese; $0 \leq y \leq 0.5$ when M is titanium, vanadium, chromium, or iron; and $y \leq 0.4$ when M is aluminum; and
$0 \leq x \leq 0.25$ when N is magnesium or calcium; and $0 \leq x \leq 0.1$ when N is strontium, barium, or zinc.

21. The lithium-ion secondary cell recited in claim 18, wherein said material has the composition

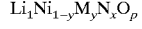

wherein:
M is selected from the group consisted of titanium, vanadium, chromium, manganese, iron, cobalt, and aluminum;
N is selected from the group consisting of magnesium, calcium, strontium, barium, and zinc;
$0 \leq y \leq 1$ when M is cobalt or manganese; $0 \leq y \leq 0.5$ when M is titanium, vanadium, chromium, or iron; and $y \leq 0.4$ when M is aluminum;
$0 \leq x \leq 0.25$ when N is magnesium or calcium; and $0 \leq x \leq 0.1$ when N is strontium, barium, or zinc; and
$2(1+x/2) \leq p \leq 2(1+x)$.

22. A process for producing a lithium transition metal oxide crystalline material, the process comprising:
combining at least an amount of a lithium-containing material, an amount of a transition metal-containing material, and an amount of a material containing atoms of at least one element selected from the group consisting of group II elements and zinc to yield a homogenous solid therefrom; and
heat treating said homogenous solid to produce an active crystalline lithium transition metal oxide material that contains atoms of said at least one element selected from the group consisting of group II elements and zinc, said amounts selected so that in said active material said atoms of said at least one element selected from the group consisting of group II elements and zinc occupy sites within crystal layers of said active material including transition metal atoms.

23. The process recited in claim 22 wherein said act of combining includes:

dissolving said amounts in at least one solvent to provide a homogenous solution; and drying said homogenous solution while constantly stirring to remove said solvent from said homogenous solution and provide said homogenous solid.

24. The process recited in claim 22 wherein said act of combining includes:

dissolving said amounts in at least one solvent to provide a homogenous solution; and spraying said homogenous solution through an atomizing nozzle into a chamber, said chamber being maintained at a temperature above the drying temperature of said solvent, to evaporate said solvent and provide said homogenous solid in a powder form.

25. The process recited in claim 22 wherein in said act of combining, said lithium-containing material comprises lithium hydroxide and wherein said act of combining includes:

dissolving said amount of lithium hydroxide and said amount of transition metal-containing material in an organic solvent to form a lithium-containing solution;

preparing an aqueous solution of said amount of material containing atoms of said at least one element selected from group II elements and zinc;

mixing together said aqueous solution and said lithium-containing solution to form a mixture;

allowing said mixture to stand until gelation occurs and a gel is provided; and drying said gel to obtain said homogenous solid.

26. The process recited in claim 22 wherein said active crystalline lithium transition metal oxide material containing atoms of at least one element selected from the group consisting of group II elements and zinc has the composition $Li_{1+x}Ni_{1-y}M_yN_zO_p$ wherein:

M is selected from the group consisting of titanium, vanadium, chromium, manganese, iron, cobalt, and aluminum;

N is selected from the group consisting of magnesium, calcium, strontium, barium, and zinc;

$0 \leq x \leq z$;

$2(1+z/2) \leq p \leq 2(1+z)$;

$0 \leq y \leq 1$ when M is cobalt or manganese; $0 \leq y \leq 0.5$ when M is titanium, vanadium, chromium, or iron; and $y \leq 0.4$ when M is aluminum; and $0 \leq z \leq 0.25$ when N is magnesium or calcium; and $0 \leq z \leq 0.1$ when N is strontium, zinc, or barium.

27. The process recited in claim 22 wherein said active crystalline lithium transition metal oxide material containing atoms of at least one element selected from the group consisting of group II elements and zinc has the composition $Li_{1+x}Ni_{1-y}M_yN_xO_{2(1+x)}$ wherein:

M is selected from the group consisting of titanium, vanadium, chromium, manganese, iron, cobalt, and aluminum;

N is selected from the group consisting of magnesium, calcium, strontium, barium, and zinc;

$0 \leq y \leq 1$ when M is cobalt or manganese; $0 \leq y \leq 0.5$ when M is titanium, vanadium, chromium, or iron; and y=0.4 when M4 is aluminum; and $0 \leq x \leq 0.25$ when N is magnesium or calcium; and $0 \leq x \leq 0.1$ when N is strontium, barium, or zinc.

28. The process recited in claim 22 wherein said active crystalline lithium transition metal oxide material containing atoms of at least one element selected from the group consisting group II elements and zinc has the composition $Li_1Ni_{1-y}M_yN_xO_p$ wherein:

M is selected from the group consisted of titanium, vanadium, chromium, manganese, iron, cobalt, and aluminum;

N is selected from the group consisting of magnesium, calcium, strontium, barium, and zinc;

$0 \leq y \leq 1$ when M is cobalt or manganese; $0 \leq y \leq 0.5$ when M is titanium, vanadium, chromium, or iron; and $y \leq 0.4$ when M is aluminum;

$0 \leq x \leq 0.25$ when N is magnesium or calcium; and $0 \leq x \leq 0.1$ when N is strontium, barium, or zinc; and $2(1+x/2) \leq p \leq 2(1+x)$.

29. A process for producing a lithium-ion secondary cell, the process comprising fabricating the cell from:

a cathode comprising a crystalline material comprising atoms of lithium, oxygen, and at least one transition metal, said material further comprising divalent cations on sites within atom layers of said material including atoms of said at least one transition metal;

an anode that is compatible with said cathode; and an electrolyte that is compatible with said cathode.

30. The material recited in claim 1 having the composition $Li_{1+x}NiN_xO_{2(1+x)}$ where:

N is selected from the group consisting of magnesium, calcium, barium, strontium, and zinc; and $0.03 \leq x \leq 0.25$.

31. The material recited in claim 30, wherein $0.07 \leq x \leq 0.15$.

32. The material recited in claim 1 having the composition $Li_{1+x}Ni_{1-y}Co_yN_xO_{2(1+x)}$ where:

N is selected from the group consisting of magnesium, calcium, barium, strontium, and zinc;

$0.1 \leq y \leq 0.4$; and $0.03 \leq x \leq 0.25$.

33. The material recited in claim 32, wherein $0.03 \leq x \leq 0.15$.

34. The material recited in claim 1 having the composition $$Li_{1+x}CoN_xO_{2(1+x)}$$

where:

N is selected from the group consisting of magnesium, calcium, barium, strontium, and zinc; and $0.03 \leq x \leq 0.25$.

35. The material recited in claim 34, wherein $0.03 \leq x \leq 0.15$.

36. The material recited in claim 1 having a composition selected from the group consisting of $Li_{1.03}Ni_{0.75}Co_{0.25}Mg_{0.03}O_{2.06}$, $Li_{1.05}Ni_{0.75}Co_{0.25}Mg_{0.05}O_{2.10}$, $Li_{1.10}Ni_{0.75}Co_{0.25}Mg_{0.10}O_{2.20}$, $Li_{1.15}NiMg_{0.15}O_{2.30}$, and $LiNi_{0.75}Co_{0.25}Mg_{0.03}O_p$ where $2.03 \leq p \leq 2.06$.

* * * * *

UNITED STATES PATENT AND TRADEMARK OFFICE
CERTIFICATE OF CORRECTION

PATENT NO. : 6,017,654
DATED : January 25, 2000
INVENTOR(S) : Kumta et al.

It is certified that error appears in the above-identified patent and that said Letters Patent is hereby corrected as shown below:

Column 7,
Line 50, delete "$Mg_{0.01}$" and substitute therefor -- $Mg_{0.10}$ --
Line 51, delete "$Li_{0.08}$" and substitute therefor -- $Li_{0.8}$ --

Column 21,
Line 44, delete "$N_{0.75}$" and substitute therefor -- $Ni_{0.75}$ --

Column 22,
Line 42, delete "$Li_{0.08}$" and substitute therefor -- $Li_{0.8}$ --

Column 23,
Lines 16 and 17, delete "$\leq$" (first occurrence) and substitute therefor -- < --

Column 24,
Line 1, after "said" insert -- divalent cations within said --

Column 25,
Line 57, delete "itanium" and substitute therefor -- titanium --

Column 27,
Line 3, after "material" insert -- at least a portion of --

Column 28,
Line 8, delete "y=0.4" and substitute therefor -- y$\leq$0.4 --
Line 9, delete "M4" and substitute therefor -- M --

Signed and Sealed this

Twenty-ninth Day of April, 2003

JAMES E. ROGAN
*Director of the United States Patent and Trademark Office*